(12) United States Patent
Nam et al.

(10) Patent No.: US 10,873,416 B2
(45) Date of Patent: Dec. 22, 2020

(54) TECHNIQUES AND APPARATUSES FOR DETERMINING UPLINK TRANSMISSION TIMELINES RELATED TO A CHANNEL STATE INFORMATION REFERENCE SIGNAL (CSI-RS)

(71) Applicant: QUALCOMM Incorporated, San Diego, CA (US)

(72) Inventors: Wooseok Nam, San Diego, CA (US); Alexandros Manolakos, San Diego, CA (US); Tao Luo, San Diego, CA (US); Peter Gaal, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/406,694

(22) Filed: May 8, 2019

(65) Prior Publication Data

US 2019/0349122 A1 Nov. 14, 2019

(30) Foreign Application Priority Data

May 11, 2018 (GR) ............................. 20180100204

(51) Int. Cl.
| | | |
|---|---|---|
| H04W 72/04 | (2009.01) | |
| H04L 1/00 | (2006.01) | |
| H04L 5/00 | (2006.01) | |
| H04W 56/00 | (2009.01) | |
| H04W 72/12 | (2009.01) | |
| H04L 25/02 | (2006.01) | |

(52) U.S. Cl.
CPC .......... *H04L 1/0026* (2013.01); *H04L 5/0051* (2013.01); *H04L 25/0226* (2013.01);
(Continued)

(58) Field of Classification Search
CPC . H04L 1/0026; H04L 5/0051; H04L 25/0226; H04L 5/0023; H04L 5/0057;
(Continued)

(56) References Cited

U.S. PATENT DOCUMENTS

| 2016/0112892 A1* | 4/2016 | Damnjanovic ....... H04W 24/10 370/336 |
| 2018/0227035 A1* | 8/2018 | Cheng .................. H04B 7/0695 |
| 2019/0045494 A1* | 2/2019 | Ho ........................ H04W 76/27 |

FOREIGN PATENT DOCUMENTS

| WO | 2016061382 A1 | 4/2016 | |
| WO | 2017166024 A1 | 10/2017 | |
| WO | WO-2017166024 A1 * | 10/2017 | ........... H04L 5/0091 |

OTHER PUBLICATIONS

International Search Report and Written Opinion—PCT/US2019/031462—ISA/EPO—dated Sep. 12, 2019.
(Continued)

*Primary Examiner* — Rina C Pancholi
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station (BS), a transmission of a channel state information reference signal (CSI-RS), wherein the transmission of the CSI-RS is received at least a quantity of symbols prior to a symbol of a scheduled uplink transmission from the UE. The UE may determine an uplink transmit beam for the scheduled uplink transmission based at least in part on receiving the transmission of the CSI-RS. Numerous other aspects are provided.

56 Claims, 17 Drawing Sheets

(52) U.S. Cl.
CPC ....... *H04W 56/001* (2013.01); *H04W 72/042* (2013.01); *H04W 72/046* (2013.01); *H04W 72/0446* (2013.01); *H04W 72/1268* (2013.01)

(58) Field of Classification Search
CPC .............. H04L 1/0027; H04W 72/046; H04W 56/001; H04W 72/042; H04W 72/1268; H04W 72/0446; H04W 24/10; H04B 7/0695; H04B 7/0647; H04B 7/0617
See application file for complete search history.

(56) References Cited

OTHER PUBLICATIONS

QUALCOMM: "Beam management for NR", 3GPP Draft; R1-1718541, 3rd Generation Partnership Project (3GPP), Mobile Competence Centre, 650, Route Des Lucioles, F-06921 Sophia-Antipolis Cedex, France, vol. Ran WG1, No. Prague. P.R. Czechia; Oct. 9, 2017-Oct. 13, 2017 Oct. 3, 2017, XP051353109, 18 pages. Retrieved from the Internet: URL:http://www.3gpp.org/ftp/tsg_ran/WG1_RL1/TSGR1_90b/Docs/ [retrieved on Oct. 3, 2017], fig. 1 +par. 3. 1. 1, 4 .,6.,9.
Samsung: "On Beam Management, Measurement and Reporting", 3GPP Draft, R1-1717605_V6, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), XP051340791, 16 Pages, Retrieved from the Internet: URL:http://ww.3gpp.org/ftp/Meetings_3GPP_SYNC/RAN1/Docs/ [retrieved on Oct. 8, 2017].

* cited by examiner

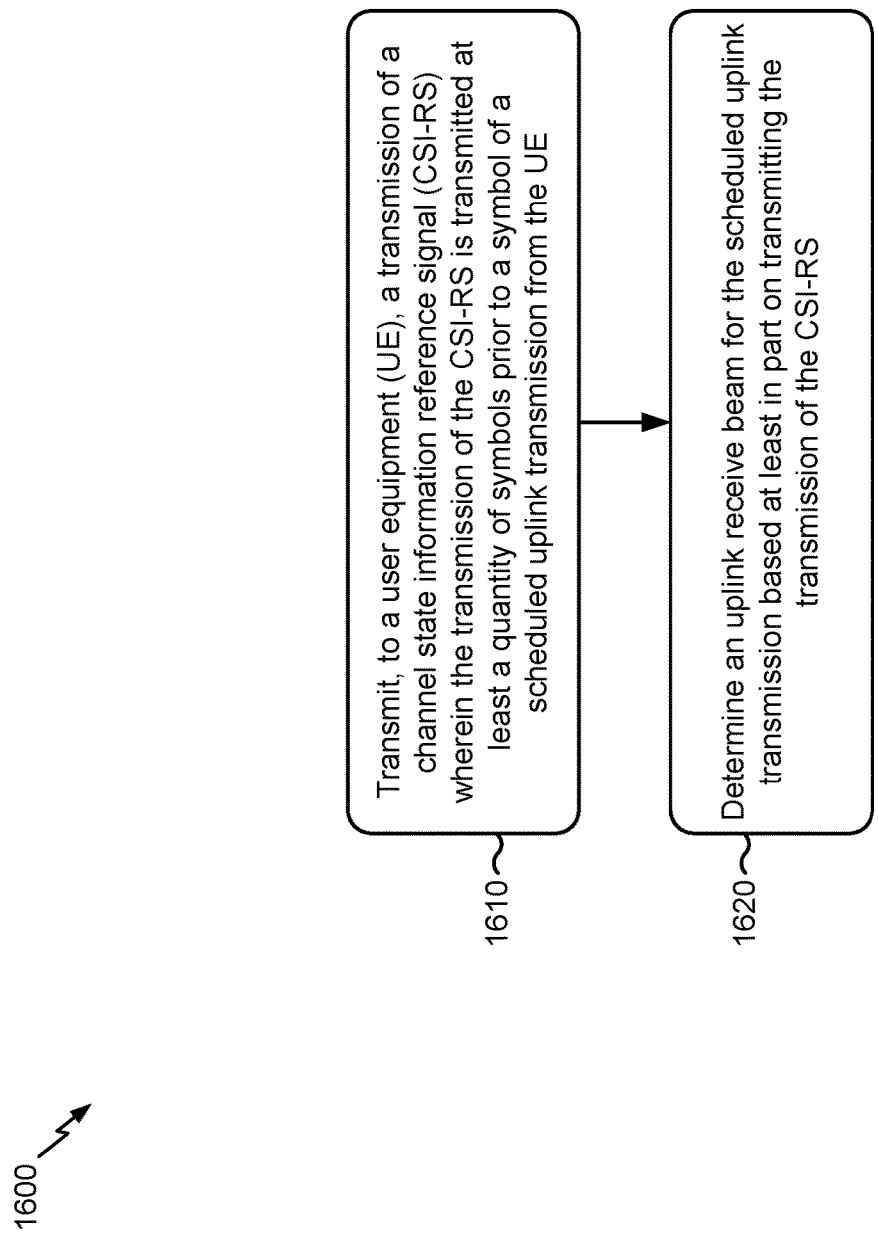

TECHNIQUES AND APPARATUSES FOR DETERMINING UPLINK TRANSMISSION TIMELINES RELATED TO A CHANNEL STATE INFORMATION REFERENCE SIGNAL (CSI-RS)

CROSS-REFERENCE TO RELATED APPLICATIONS UNDER 35 U.S.C. § 119

This application claims priority to Greek Patent Application No. 20180100204, filed on May 11, 2018, entitled "TECHNIQUES AND APPARATUSES FOR DETERMINING UPLINK TRANSMISSION TIMELINES RELATED TO A CHANNEL STATE INFORMATION REFERENCE SIGNAL (CSI-RS)" which is hereby expressly incorporated by reference herein.

FIELD OF THE DISCLOSURE

Aspects of the present disclosure generally relate to wireless communication, and more particularly to techniques and apparatuses for determining uplink transmission timelines related to a channel state information reference signal (CSI-RS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station (BS), a transmission of a channel state information reference signal (CSI-RS), wherein the transmission of the CSI-RS is received at least a quantity of symbols prior to a symbol of a scheduled uplink transmission from the UE; and determining an uplink transmit beam for the scheduled uplink transmission based at least in part on receiving the transmission of the CSI-RS.

In some aspects, a UE for wireless communication may include memory and one or more processors coupled to the memory. The memory and the one or more processors may be configured to receive, from a BS, a transmission of a CSI-RS, wherein the transmission of the CSI-RS is received at least a quantity of symbols prior to a symbol of a scheduled uplink transmission from the UE; and determine an uplink transmit beam for the scheduled uplink transmission based at least in part on receiving the transmission of the CSI-RS.

In some aspects, a method of wireless communication, performed by a BS, may include transmitting, to a UE, a transmission of a CSI-RS, wherein the transmission of the CSI-RS is transmitted at least a quantity of symbols prior to a symbol of a scheduled uplink transmission from the UE; and determining an uplink receive beam for the scheduled uplink transmission based at least in part on transmitting the transmission of the CSI-RS.

In some aspects, a BS for wireless communication may include memory and one or more processors coupled to the memory. The memory and the one or more processors may be configured to transmit, to a UE, a transmission of a CSI-RS, wherein the transmission of the CSI-RS is transmitted at least a quantity of symbols prior to a symbol of a scheduled uplink transmission from the UE; and determine an uplink receive beam for the scheduled uplink transmission based at least in part on transmitting the transmission of the CSI-RS.

In some aspects, a method of wireless communication, performed by a UE, may include receiving, from a BS, a transmission of an aperiodic channel state information reference signal (A-CSI-RS), wherein the transmission of the A-CSI-RS has a closest temporal proximity prior to a scheduled uplink transmission from the UE and relative to one or more other transmissions of the A-CSI-RS. The method may include determining an uplink transmit beam for the scheduled uplink transmission based at least in part on receiving the transmission of the A-CSI-RS.

In some aspects, a user equipment for wireless communication may include memory and one or more processors coupled to the memory. The memory and the one or more processors may be configured to receive, from a BS, a transmission of an A-CSI-RS, wherein the transmission of the A-CSI-RS has a closest temporal proximity prior to a scheduled uplink transmission from the UE and relative to one or more other transmissions of the A-CSI-RS. The memory and the one or more processors may be configured to determine an uplink transmit beam for the scheduled uplink transmission based at least in part on receiving the transmission of the A-CSI-RS.

In some aspects, a non-transitory computer-readable medium may store one or more instructions for wireless communication. The one or more instructions, when executed by one or more processors of a UE, may cause the one or more processors to receive, from a BS, a transmission of an A-CSI-RS, wherein the transmission of the A-CSI-RS has a closest temporal proximity prior to a scheduled uplink transmission from the UE and relative to one or more other transmissions of the A-CSI-RS. The one or more instructions, when executed by the one or more processors, may cause the one or more processors to determine an uplink transmit beam for the scheduled uplink transmission based at least in part on receiving the transmission of the A-CSI-RS.

In some aspects, an apparatus for wireless communication may include means for receiving, from a BS, a transmission of an A-CSI-RS, wherein the transmission of the A-CSI-RS has a closest temporal proximity prior to a scheduled uplink transmission from the apparatus and relative to one or more other transmissions of the A-CSI-RS. The apparatus may include means for determining an uplink transmit beam for the scheduled uplink transmission based at least in part on receiving the transmission of the A-CSI-RS.

In some aspects, a method of wireless communication, performed by a UE, may include receiving, from a BS, a set of CSI-RS resources, wherein the set of CSI-RS resources is configured with repetition. The method may include determining that an uplink transmission is to be scheduled at least a quantity of symbols after a symbol in which a CSI-RS resource, of the set of CSI-RS resources, was received.

In some aspects, a user equipment for wireless communication may include memory and one or more processors coupled to the memory. The memory and the one or more processors may be configured to receive, from a BS, a set of CSI-RS resources, wherein the set of CSI-RS resources is configured with repetition. The memory and the one or more processors may be configured to determine that an uplink transmission is to be scheduled at least a quantity of symbols after a symbol in which a CSI-RS resource, of the set of CSI-RS resources, was received.

In some aspects, a non-transitory computer-readable medium may store one or more instructions for wireless communication. The one or more instructions, when executed by one or more processors of a user equipment, may cause the one or more processors to receive, from a BS, a set of CSI-RS resources, wherein the set of CSI-RS resources is configured with repetition. The one or more instructions, when executed by the one or more processors, may cause the one or more processors to determine that an uplink transmission is to be scheduled at least a quantity of symbols after a symbol in which a CSI-RS resource, of the set of CSI-RS resources, was received.

In some aspects, an apparatus for wireless communication may include means for receiving, from a BS, a set of CSI-RS resources, wherein the set of CSI-RS resources is configured with repetition. The apparatus may include means for determining that an uplink transmission is to be scheduled at least a quantity of symbols after a symbol in which a CSI-RS resource, of the set of CSI-RS resources, was received.

In some aspects, a method of wireless communication, performed by a BS, may include transmitting, to a UE, a transmission of an A-CSI-RS, wherein the transmission of the A-CSI-RS has a closest temporal proximity prior to a scheduled uplink transmission from the UE and relative to one or more other transmissions of the A-CSI-RS. The method may include determining an uplink receive beam for the scheduled uplink transmission based at least in part on transmitting the transmission of the A-CSI-RS.

In some aspects, a base station for wireless communication may include memory and one or more processors coupled to the memory. The memory and the one or more processors may be configured to transmit, to a UE, a transmission of an A-CSI-RS, wherein the transmission of the A-CSI-RS has a closest temporal proximity prior to a scheduled uplink transmission from the UE and relative to one or more other transmissions of the A-CSI-RS. The memory and the one or more processors may be configured to determine an uplink receive beam for the scheduled uplink transmission based at least in part on transmitting the transmission of the A-CSI-RS.

In some aspects, a non-transitory computer-readable medium may store one or more instructions for wireless communication. The one or more instructions, when executed by one or more processors of a base station, may cause the one or more processors to transmit, to a UE, a transmission of an A-CSI-RS, wherein the transmission of the A-CSI-RS has a closest temporal proximity prior to a scheduled uplink transmission from the UE and relative to one or more other transmissions of the A-CSI-RS. The one or more instructions, when executed by the one or more processors, may cause the one or more processors to determine an uplink receive beam for the scheduled uplink transmission based at least in part on transmitting the transmission of the A-CSI-RS.

In some aspects, an apparatus for wireless communication may include means for transmitting, to a UE, a transmission of an A-CSI-RS, wherein the transmission of the A-CSI-RS has a closest temporal proximity prior to a scheduled uplink transmission from the UE and relative to one or more other transmissions of the A-CSI-RS. The apparatus may include means for determining an uplink receive beam for the scheduled uplink transmission based at least in part on transmitting the transmission of the A-CSI-RS.

In some aspects, a method of wireless communication, performed by a BS, may include transmitting, to a UE, a set of CSI-RS resources, wherein the set of CSI-RS resources is configured with repetition. The method may include determining that an uplink transmission is to be scheduled at least a quantity of symbols after a symbol in which a CSI-RS resource, of the set of CSI-RS resources, was transmitted based at least in part on transmitting the set of CSI-RS resources.

In some aspects, a base station for wireless communication may include memory and one or more processors coupled to the memory. The memory and the one or more processors may be configured to transmit, to a UE, a set of CSI-RS resources, wherein the set of CSI-RS resources is configured with repetition. The memory and the one or more processors may be configured to determine that an uplink transmission is to be scheduled at least a quantity of symbols after a symbol in which a CSI-RS resource, of the set of CSI-RS resources, was transmitted based at least in part on transmitting the set of CSI-RS resources.

In some aspects, a non-transitory computer-readable medium may store one or more instructions for wireless communication. The one or more instructions, when executed by one or more processors of a base station, may cause the one or more processors to transmit, to a UE, a set of CSI-RS resources, wherein the set of CSI-RS resources is configured with repetition. The one or more instructions, when executed by the one or more processors, may cause the one or more processors to determine that an uplink transmission is to be scheduled at least a quantity of symbols after a symbol in which a CSI-RS resource, of the set of CSI-RS resources, was transmitted based at least in part on transmitting the set of CSI-RS resources.

In some aspects, an apparatus for wireless communication may include means for transmitting, to a UE, a set of CSI-RS resources, wherein the set of CSI-RS resources is configured with repetition. The apparatus may include means for determining that an uplink transmission is to be scheduled at least a quantity of symbols after a symbol in which a CSI-RS resource, of the set of CSI-RS resources, was transmitted based at least in part on transmitting the set of CSI-RS resources.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 16 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
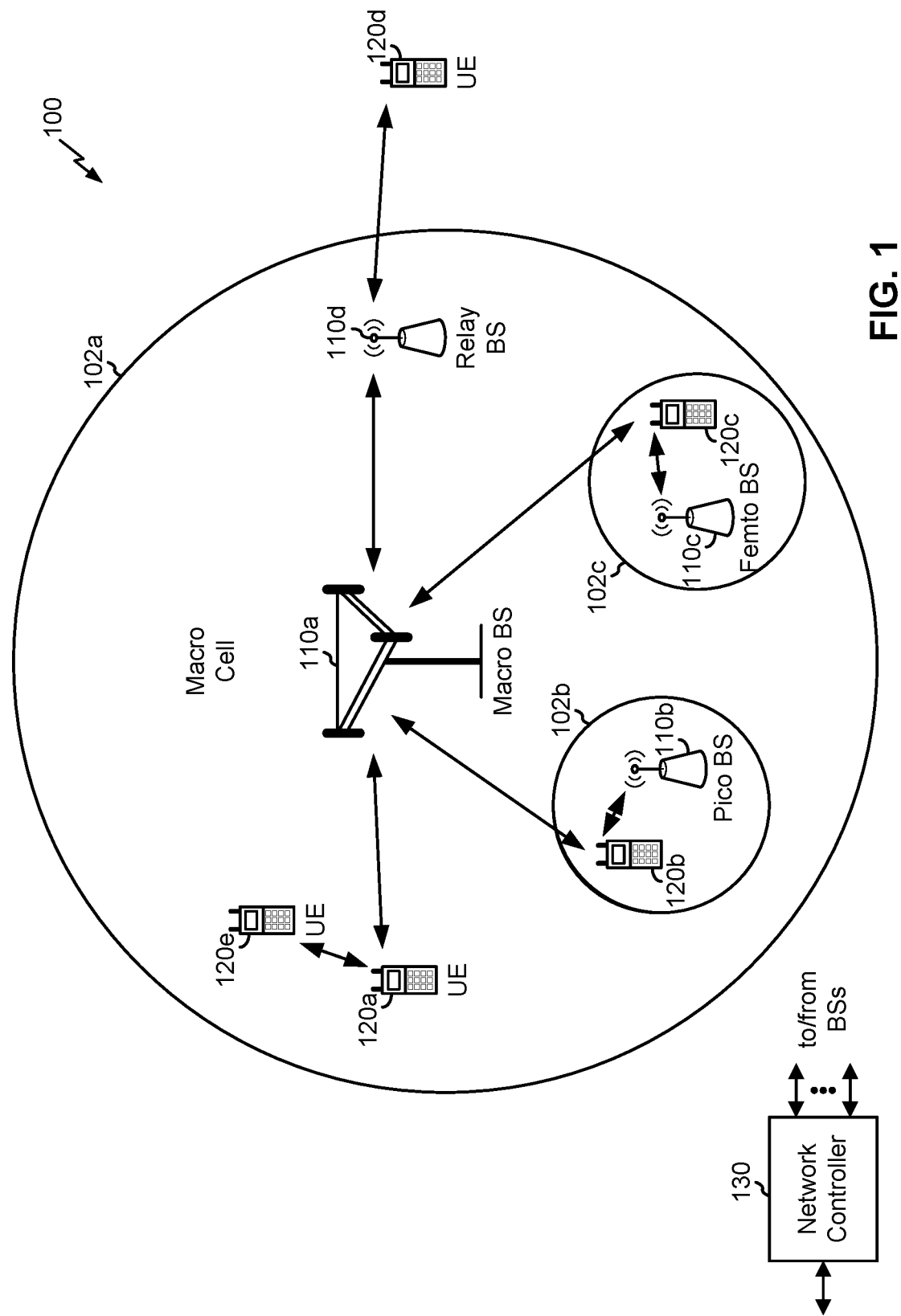
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
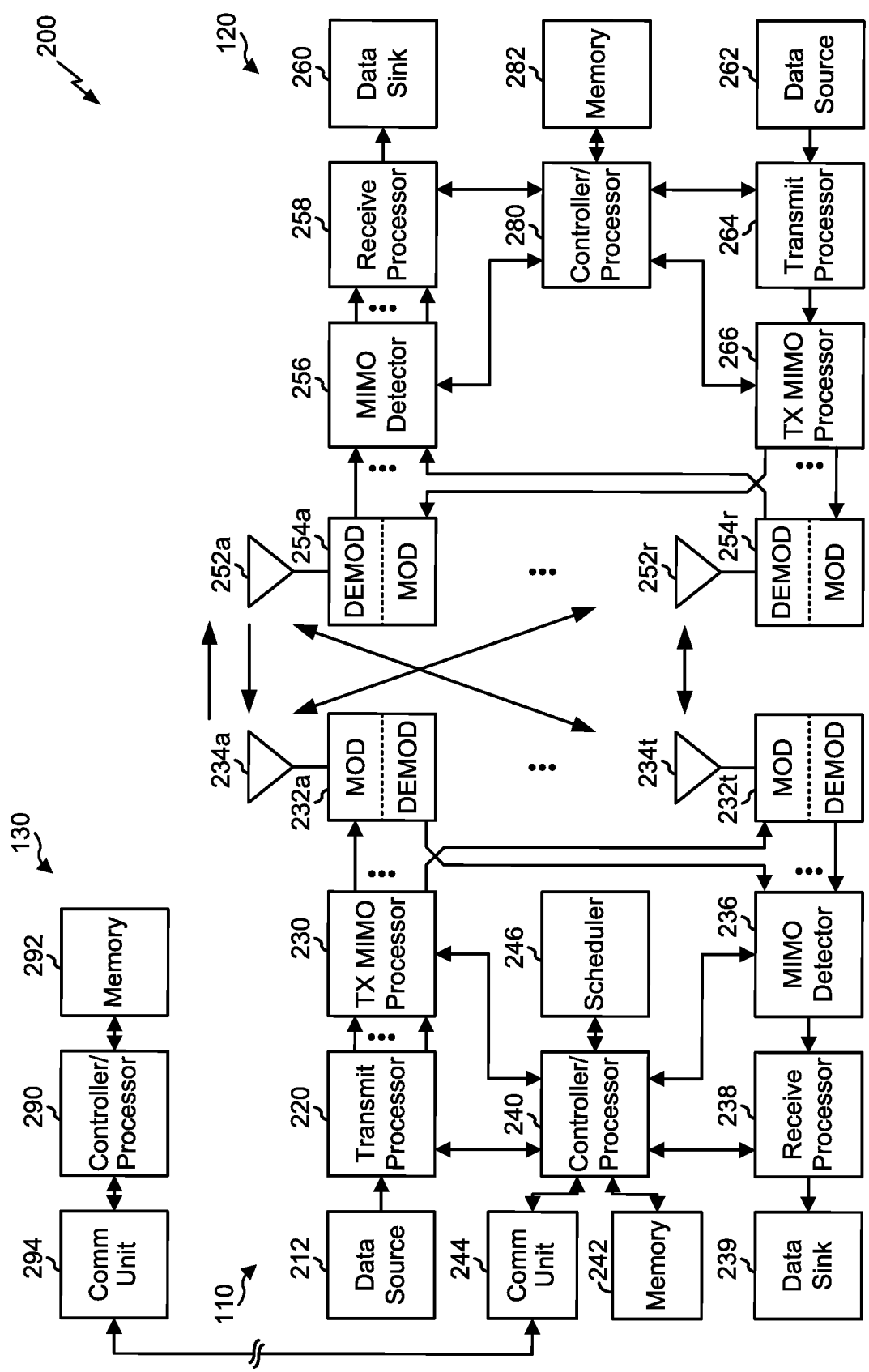
FIG. 2 is a block diagram conceptually illustrating an example of a base station in communication with a user equipment in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with determining timelines related to an A-CSI-RS, a CSI-RS, a set of CSI-RS resources, and/or the like, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, process 1500 of FIG. 15, process 1600 of FIG. 16, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a base station, a transmission of an aperiodic channel state information reference signal (A-CSI-RS), means for determining an uplink transmit beam for a scheduled uplink transmission based at least in part on receiving the transmission of the A-CSI-RS, and/or the like. In some aspects, such means may include one or more components of UE 120 described in connection with FIG. 2.

Additionally, or alternatively, UE 120 may include means for receiving, from a base station, a set of channel state information reference signal (CSI-RS) resources, means for determining that an uplink transmission is to be scheduled at least a quantity of symbols after a symbol in which a CSI-RS resource, of the set of CSI-RS resources, was received, and/or the like. In some aspects, such means may include one or more components of UE 120 described in connection with FIG. 2.

Additionally, or alternatively, UE 120 may include means for receiving, from a base station (BS), a transmission of a channel state information reference signal (CSI-RS), wherein the transmission of the CSI-RS is received at least a quantity of symbols prior to a symbol of a scheduled uplink transmission from the UE; means for determining an uplink transmit beam for the scheduled uplink transmission based at least in part on receiving the transmission of the CSI-RS; and/or the like. In some aspects, such means may include one or more components of UE 120 described in connection with FIG. 2.

In some aspects, base station 110 may include means for transmitting, to a user equipment, a transmission of an A-CSI-RS, means for determining an uplink receive beam for a scheduled uplink transmission based at least in part on transmitting the transmission of the A-CSI-RS, and/or the like. In some aspects, such means may include one or more components of base station 110 described in connection with FIG. 2.

Additionally, or alternatively, base station 110 may further include means for transmitting, to a user equipment, a set of CSI-RS resources, means for determining that an uplink transmission is to be scheduled at least a quantity of symbols after a symbol in which a CSI-RS resource, of the set of CSI-RS resources, was transmitted based at least in part on transmitting the set of CSI-RS resources, and/or the like. In some aspects, such means may include one or more components of base station 110 described in connection with FIG. 2.

Additionally, or alternatively, base station 110 may further include means for transmitting, to a UE, a transmission of a CSI-RS, wherein the transmission of the CSI-RS is transmitted at least a quantity of symbols prior to a symbol of a scheduled uplink transmission from the UE; means for determining an uplink receive beam for the scheduled uplink transmission based at least in part on transmitting the transmission of the CSI-RS; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3A:
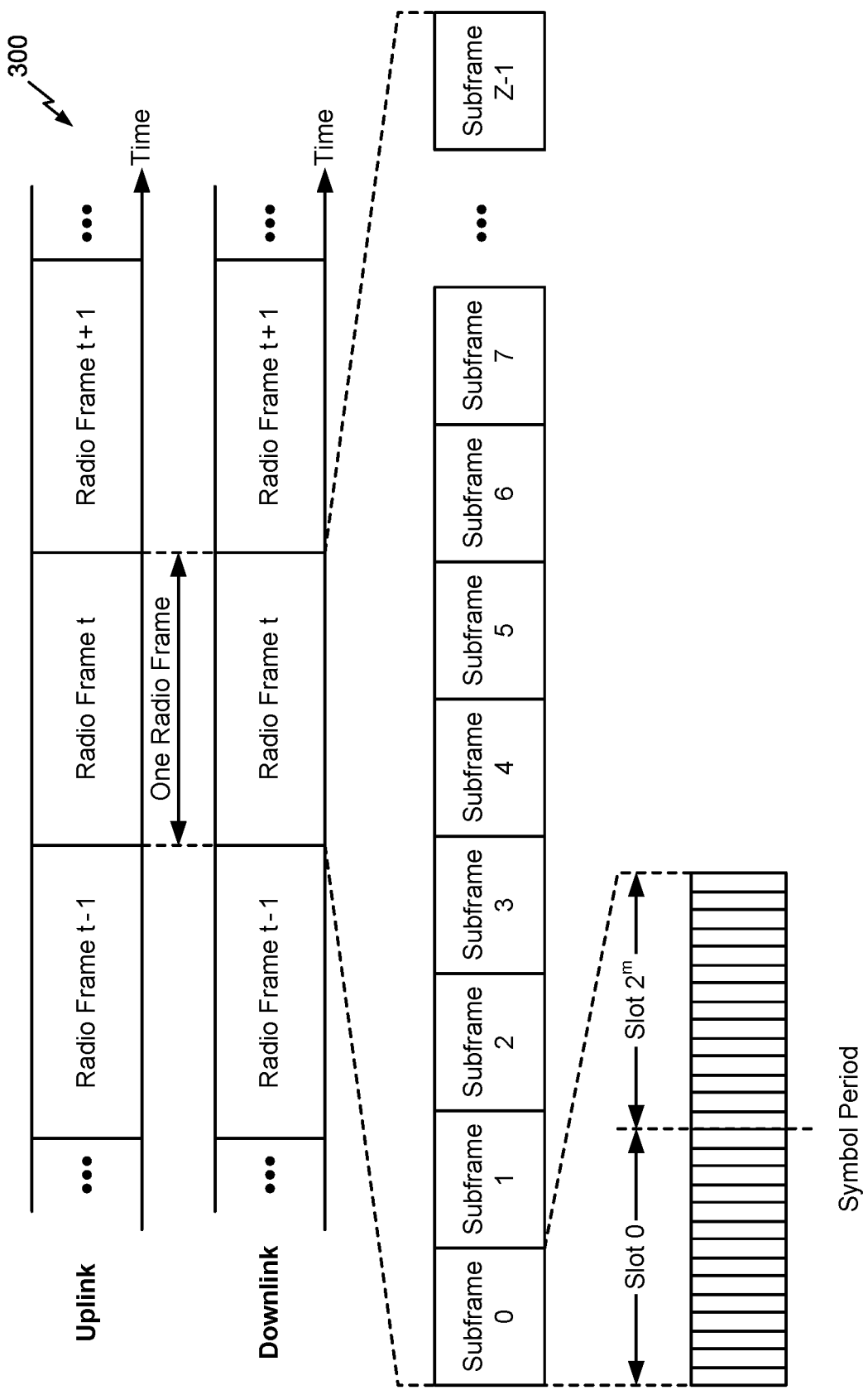
FIG. 3A is a block diagram conceptually illustrating an example of a frame structure in a wireless communication network, in accordance with various aspects of the present disclosure.

FIG. 3A shows an example frame structure 300 for frequency division duplex (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
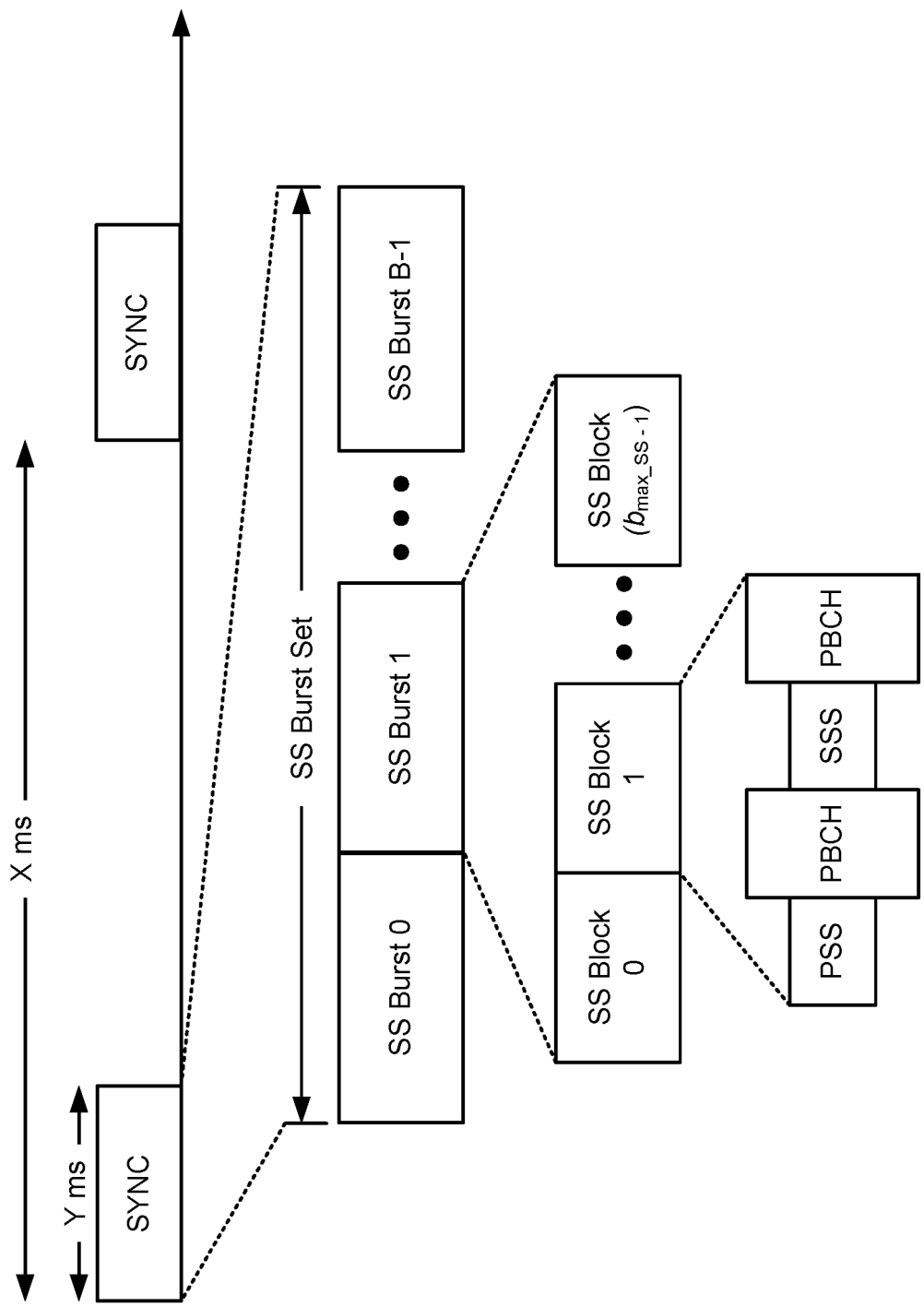
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
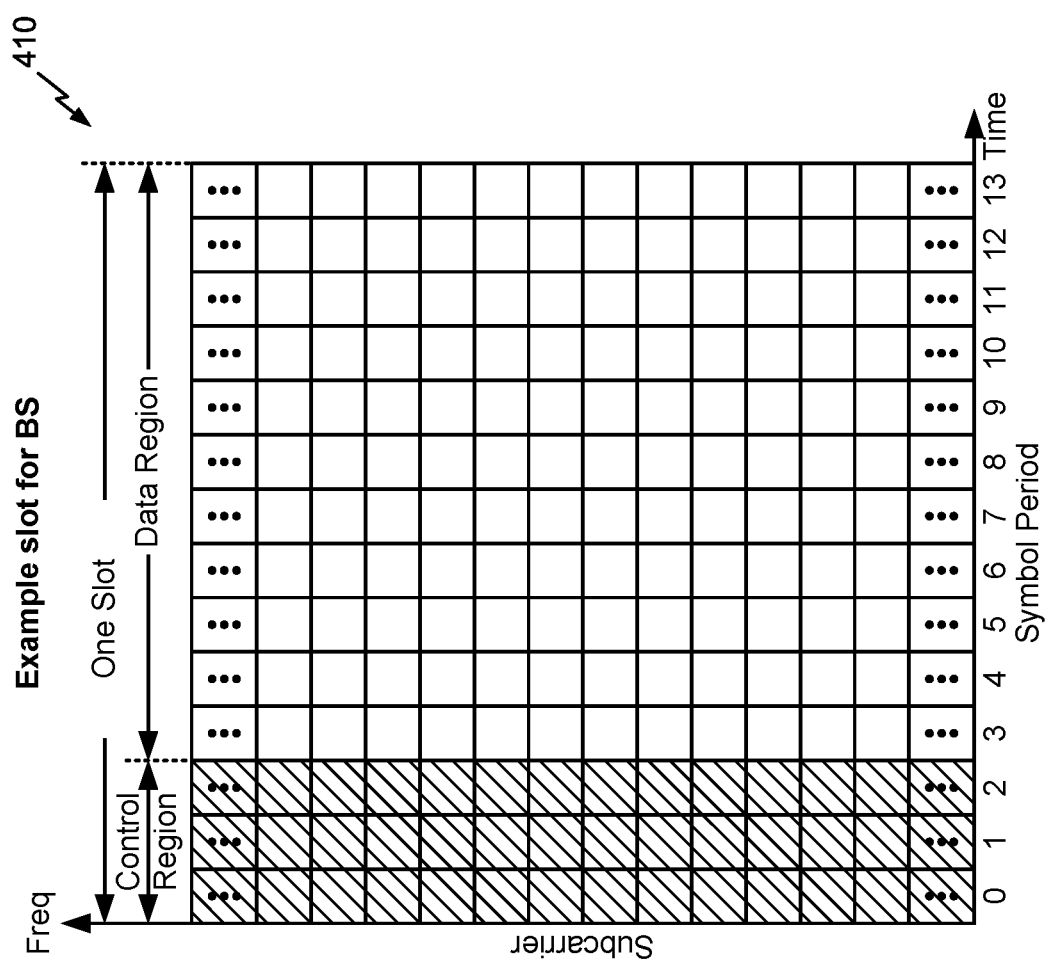
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q ∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-and-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplex (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
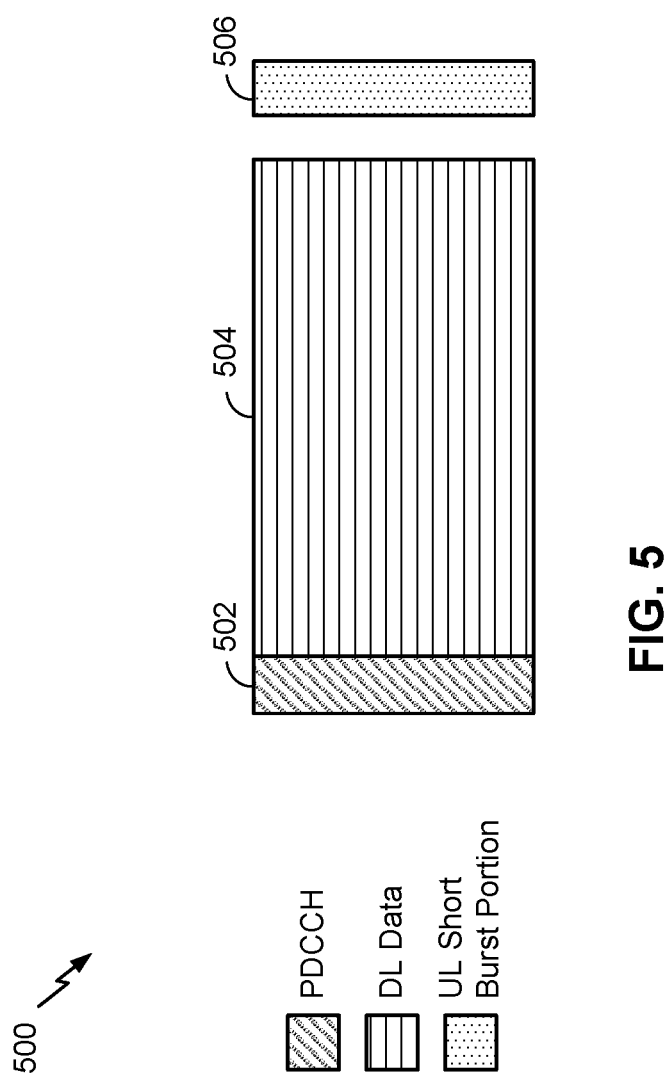
FIG. 5 is a diagram illustrating an example of a downlink (DL)-centric slot, in accordance with various aspects of the present disclosure.

FIG. 5 is a diagram 500 illustrating an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PD SCH).

The DL-centric slot may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a physical uplink control channel (PUCCH) ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples may differ from what is described with regard to FIG. 5.

Figure 6:
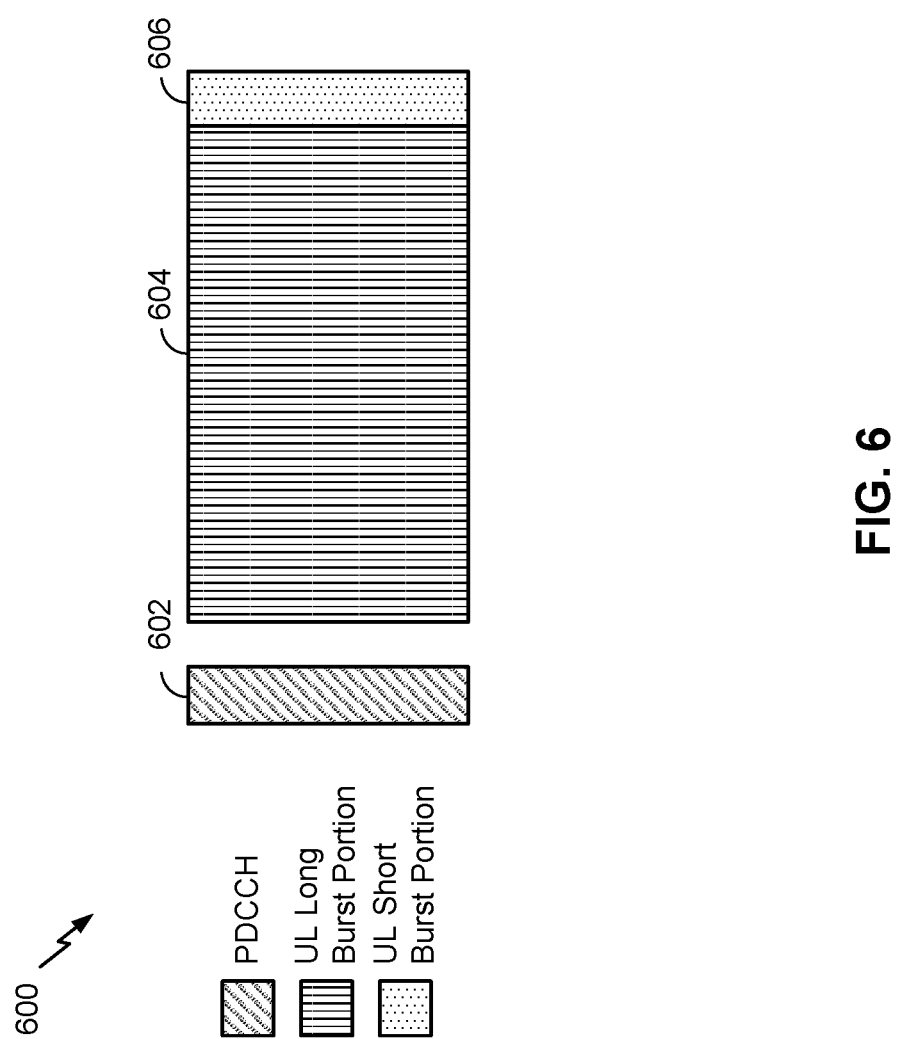
FIG. 6 is a diagram illustrating an example of an uplink (UL)-centric slot, in accordance with various aspects of the present disclosure.

FIG. 6 is a diagram 600 showing an example of an UL-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided merely as an example. Other examples may differ from what is described with regard to FIG. 6.

NR supports beam indication for uplink transmissions (e.g., PUSCH transmissions, PUCCH transmissions, SRSs, and/or the like) via a spatial relationship with a downlink reference signal (e.g., a signal synchronization block (SSB), a CSI-RS, and/or the like) or an uplink SRS. In some cases, a downlink transmit beam for a downlink non-zero power CSI-RS (NZP-CSI-RS) is indicated by a transmission configuration indication (TCI) state. When an uplink transmission is associated with the NZP-CSI-RS, a UE can determine an uplink transmit beam for an uplink transmission based at least in part on a downlink receive beam that corresponds to the downlink transmit beam that was used to transmit the NZP-CSI-RS to the UE (e.g., using a spatial relationship between the uplink transmission and the downlink reference signal).

Several issues can occur based on the configuration of the downlink reference signal. For example, if the downlink reference signal is configured to be aperiodic (e.g., an A-CSI-RS, an aperiodic NZP-CSI-RS, and/or the like), the downlink transmit beam used to transmit the downlink reference signal may be different in each transmission occasion (e.g., based on different TCI states indicated in the triggering DCI). In this example, if the UE receives multiple transmissions of an aperiodic downlink reference signal within a time period, the UE may not be configured to determine a particular transmit occasion of the downlink reference signal to use for determining an uplink transmit beam for an uplink transmission associated with the downlink reference signal. This can result in delay in transmitting the uplink transmission, improper selection of an uplink transmit beam, and/or the like.

Additionally, or alternatively, and as another example, if a set of resources (e.g., a set of CSI-RS resources, a set of NZP-CSI-RS resources, and/or the like) is configured with repetition, then multiple downlink receive beams may be used in association with receiving the set of resources. Accordingly, the UE may need to change the uplink transmit beam in accordance with changes to the downlink receive beam. However, the UE may not have sufficient time to change the uplink transmit beam between receipt of the last resource included in the set of resources and the uplink transmission associated with the set of resources. This can result in improper selection of an uplink transmit beam, dropped communications, a failed selection of an uplink transmit beam, and/or the like.

Some techniques and apparatuses described herein determine timelines related to a CSI-RS to facilitate beam determination in situations where a UE receives multiple transmissions of an aperiodic CSI-RS within a time period, where the UE receives a set of CSI-RS resources that is configured with repetition, and/or the like. For example, some techniques and apparatuses described herein provide a UE that is capable of determining an uplink transmit beam for a scheduled uplink transmission based at least in part on a configured spatial relationship between the scheduled uplink transmission and a transmission of a CSI-RS. Additionally, or alternatively, and as another example, some techniques and apparatuses described herein provide a UE that is capable of determining a symbol in which an uplink transmission is to be scheduled based at least in part on a CSI-RS resource, of a set of CSI-RS resources (e.g., that includes repetition), received from a BS. Continuing with the previous example, the uplink transmission may be scheduled in a symbol that provides the UE with a sufficient amount of time for uplink transmit beam determination. Some techniques and apparatuses described herein provide for signaling of such a capability.

Thus, some techniques and apparatuses described herein may improve uplink beam determination by a UE, such as in situations where a UE receives multiple transmissions of an aperiodic CSI-RS within a time period. In addition, some techniques and apparatuses described herein may improve uplink beam determination by a UE in other ways, such as by providing the UE with a sufficient amount of time for uplink beam selection in situations where the UE receives a set of CSI-RS resources that is configured with repetition. This improves uplink transmissions from the UE via improved uplink beam selection. In addition, this conserves processing resources that would otherwise be consumed due to improper selection of an uplink transmit beam. Further, this improves uplink communications from the UE via improved uplink transmit beam selection.

Figure 7:
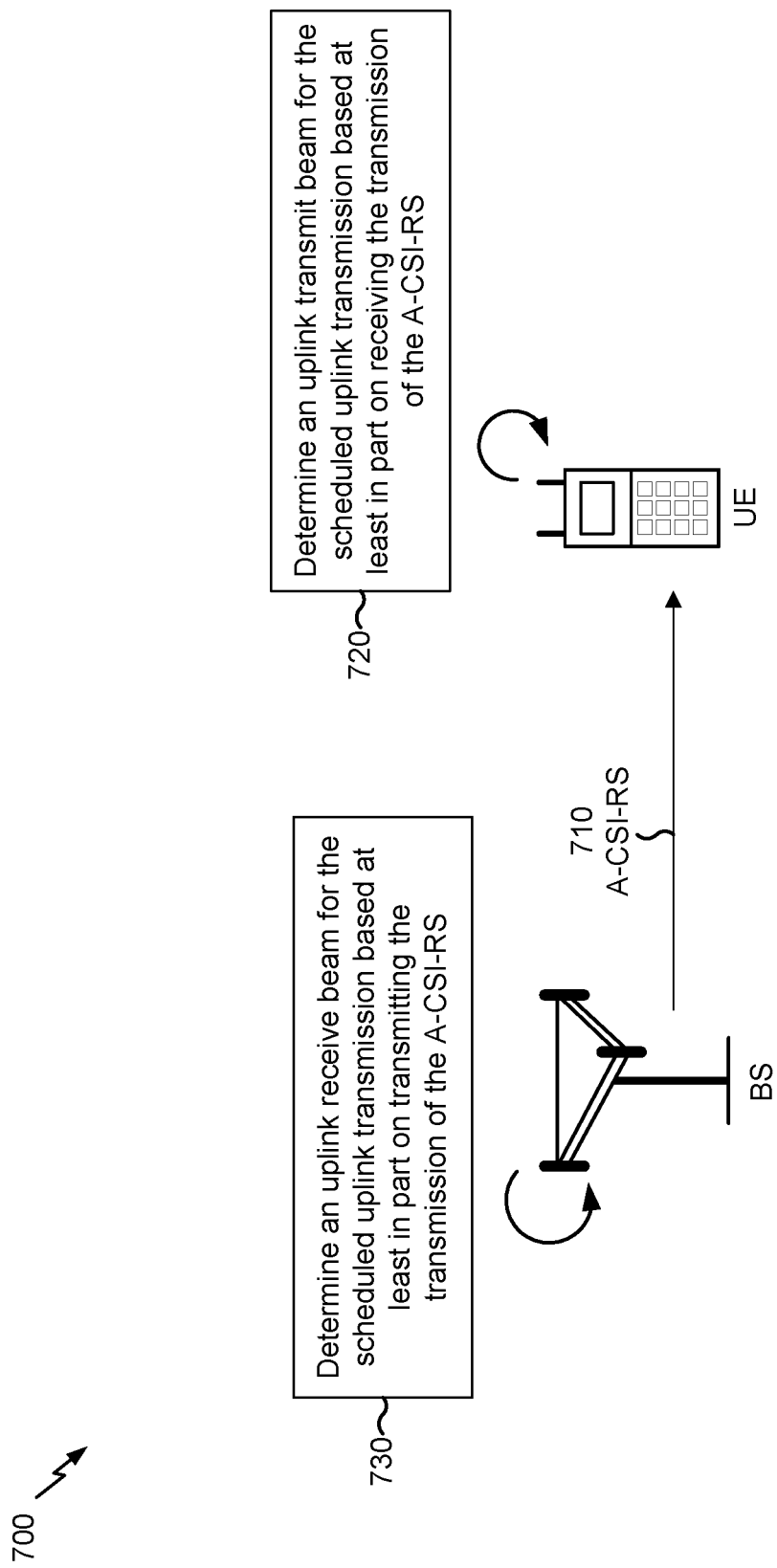
FIG. 7 is a diagram illustrating an example of determining uplink transmission timelines related to an A-CSI-RS, in accordance with various aspects of the present disclosure.

FIG. 7 is a diagram illustrating an example 700 of determining uplink transmission timelines related to an A-CSI-RS, in accordance with various aspects of the present disclosure. As shown in FIG. 7, example 700 includes a BS and a UE.

As shown by reference number 710, the BS may transmit, and the UE may receive, a transmission of an A-CSI-RS. For example, the UE may receive the transmission of the A-CSI-RS in association with a PDCCH transmission from the BS (e.g., a transmission of the A-CSI-RS may be triggered by the PDCCH) prior to transmitting a scheduled uplink transmission associated with the A-CSI-RS. In some aspects, a scheduled uplink transmission may include a PUSCH transmission, a PUCCH transmission, an SRS, and/or the like.

In some aspects, a scheduled uplink transmission may be associated with the transmission of the A-CSI-RS. For example, the scheduled uplink transmission and the transmission of the A-CSI-RS may be spatially related. Specifically, an A-CSI-RS resource set may be configured for a UE. Between the configured A-CSI-RS resource set and an uplink transmission, there may be a spatial relationship. The A-CSI-RS resource set may be triggered to be transmitted multiple times in different time occasions. Because the spatial relationship may be defined for the overall A-CSI-RS resource set, not for each triggered instance of the A-CSI-RS resource set, a temporal relationship based on the closest proximity to the uplink transmission may be defined.

In some aspects, the UE may receive downlink control information (DCI) that includes a value in a channel state information (CSI) request field of the DCI in association with receiving the A-CSI-RS transmission (e.g., the transmission of the A-CSI-RS). For example, the UE may receive the DCI in association with the PDCCH transmission from the BS. In some aspects, the value in the CSI request field may indicate a triggering state of the A-CSI-RS transmission. For example, the value may indicate a transmission configuration indication (TCI) state for measuring A-CSI-RSs and/or for reporting those measurements as CSI to the BS.

In some aspects, the A-CSI-RS transmission may have a closest temporal proximity prior to a scheduled uplink transmission from the UE and relative to one or more other transmissions of the same A-CSI-RS. For example, the UE may receive the A-CSI-RS transmission in a symbol closer in time prior to a symbol for a scheduled uplink transmission relative to other transmissions of the A-CSI-RS that the UE received prior to the symbol in which the scheduled uplink transmission is scheduled. In some aspects, the UE may receive the A-CSI-RS transmission in a same slot as a scheduled uplink transmission. In some aspects, the UE may receive the A-CSI-RS transmission in a different slot than a scheduled uplink transmission.

As shown by reference number 720, the UE may determine an uplink transmit beam for the scheduled uplink transmission based at least in part on receiving the transmission of the A-CSI-RS (e.g., in a case where an uplink transmission and a downlink transmission are configured to be spatially related via the higher-layer parameter "spatial-RelationInfo"). For example, the UE may determine the uplink transmit beam after receiving the A-CSI-RS transmission from the BS. In some aspects, the UE may determine the uplink transmit beam for the scheduled uplink transmission based at least in part on the value in the CSI request field (e.g., included in the DCI), based at least in part on the TCI state indicated by the value, and/or the like.

In some aspects, the UE may determine the uplink transmit beam during a same slot in which the A-CSI-RS transmission was received. For example, if the UE receives the A-CSI-RS transmission in the same slot as when the uplink transmission is scheduled, then the UE may determine the uplink transmit beam during the same slot in which the A-CSI-RS transmission was received. In some aspects, when the UE receives the A-CSI-RS transmission during a slot that is different than the slot in which the scheduled uplink transmission is scheduled, then the UE may determine the uplink transmit beam during the slot in which the UE received the A-CSI-RS transmission, or during the slot in which the scheduled uplink transmission is scheduled to be transmitted to the BS.

In some aspects, the UE may determine the uplink transmit beam based at least in part on a downlink receive beam via which the UE received the A-CSI-RS transmission. For example, the UE may receive the A-CSI-RS transmission via a particular downlink receive beam and may determine to use a corresponding uplink transmit beam as the uplink transmit beam for the scheduled uplink transmission.

In some aspects, prior to determining the uplink transmit beam in the manner described herein, the UE may determine whether the A-CSI-RS transmission and one or more other transmissions of the same A-CSI-RS were received within a time period. For example, the UE may determine whether the A-CSI-RS transmission and the one or more other transmissions of the A-CSI-RS were received within the same slot, within a particular amount of time of each other, and/or the like. In some aspects, if the UE determines that the A-CSI-RS transmission and the one or more other transmissions of the A-CSI-RS were received during the time period, and the UE determines that the A-CSI-RS transmission and the one or more other transmissions of A-CSI-RS are associated with different TCI states, then the UE may determine the uplink transmit beam in the manner described herein. Conversely, in some aspects, the UE may determine the uplink transmit beam in another manner (e.g., without determining whether the A-CSI-RS transmission has a closest temporal proximity prior to a scheduled uplink transmission relative to one or more other transmissions of the A-CSI-RS), such as when the A-CSI-RS transmission and the one or more other transmissions of the A-CSI-RS were not received within a time period, when the A-CSI-RS transmission and the one or more other transmissions of the A-CSI-RS are not associated with different TCI states, and/or the like. This conserves processing resources of the UE by selectively controlling when the UE determines the uplink transmit beam in the manner described herein.

As shown by reference number 730, the BS may determine an uplink receive beam for the scheduled uplink transmission based at least in part on transmitting the transmission of the A-CSI-RS. For example, the BS may determine the uplink receive beam for the scheduled uplink transmission after transmitting the transmission of the A-CSI-RS to the UE. In some aspects, the BS may determine the uplink receive beam in a manner similar to that described with respect to the UE. For example, the BS may determine the uplink receive beam after transmitting the DCI to the UE (e.g., based at least in part on the value in the CSI request field in the DCI, the TCI state, and/or the like). Additionally, or alternatively, and as another example, the BS may determine the uplink receive beam in a same slot in which the uplink transmission is scheduled or in a different slot than in which the uplink transmission is scheduled. Additionally, or alternatively, and as another example, the BS may determine the uplink receive beam based at least in part on a downlink transmit beam used to transmit the transmission of the A-CSI-RS to the UE, after determining that the A-CSI-RS transmission and one or more other transmissions of the A-CSI-RS were transmitted within a time period, and/or the like.

In some aspects, after the UE has determined the uplink transmit beam and the BS has determined the uplink receive beam, the UE may transmit the scheduled uplink transmission to the BS and the BS may receive the scheduled uplink transmission from the UE. For example, the UE may transmit the scheduled uplink transmission using the uplink transmit beam and the BS may receive the scheduled uplink transmission using the uplink receive beam.

As indicated above, FIG. 7 is provided as an example. Other examples may differ from what is described with respect to FIG. 7.

Figure 8:
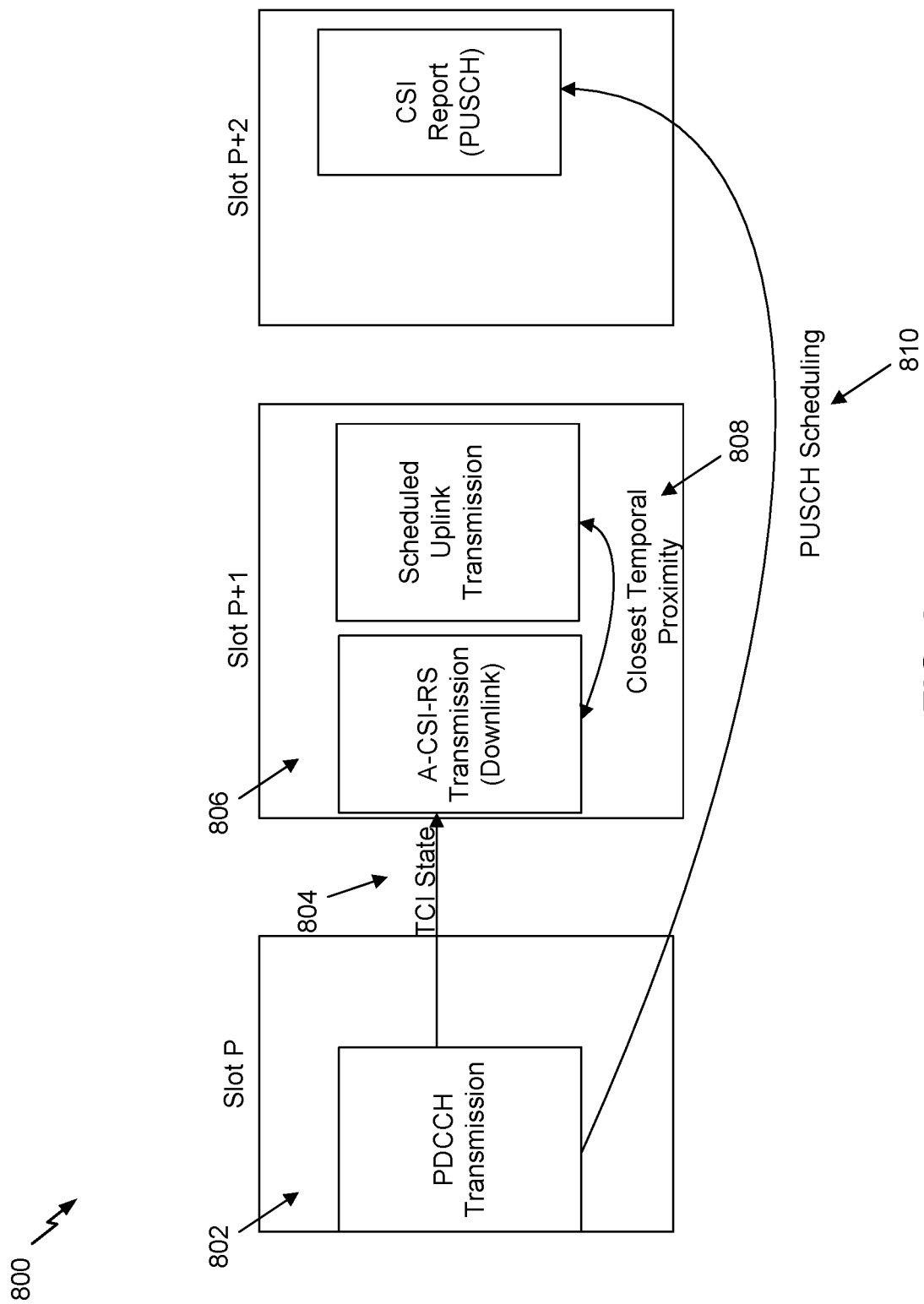
FIG. 8 is a diagram illustrating an example of determining uplink transmission timelines related to an A-CSI-RS, in accordance with various aspects of the present disclosure.

FIG. 8 is a diagram 800 illustrating an example of determining uplink transmission timelines related to an A-CSI-RS transmission, in accordance with various aspects of the present disclosure.

As shown in in FIG. 8, and by reference number 802, a UE may receive a PDCCH transmission in a first slot (e.g., slot P). In some aspects, the PDCCH transmission may be similar to other PDCCH transmissions described elsewhere herein. As shown by reference number 804, the PDCCH transmission may be associated with information that identifies a TCI state. In some aspects, the TCI state and/or the PDCCH may trigger transmission of an A-CSI-RS by a BS.

As shown by reference number 806, the UE may receive the A-CSI-RS transmission in a second slot (e.g., slot P+1), in a manner similar to that described elsewhere herein. In some aspects, the UE may receive the A-CSI-RS transmission using a downlink receive beam. As shown by reference number 808, the A-CSI-RS transmission may have a closest temporal proximity prior to a scheduled uplink transmission. For example, the A-CSI-RS transmission may be received in a same slot in which the scheduled uplink transmission is scheduled for transmission by the UE (e.g., slot P+1). In other examples, the UE may receive the A-CSI-RS transmission in a different slot than the slot in which the scheduled uplink transmission is scheduled for transmission (e.g., in slot P). In some aspects, the UE may determine an uplink transmit beam for the scheduled uplink transmission based at least in part on receiving the A-CSI-RS transmission from the BS, in a manner similar to that described elsewhere herein.

As shown by reference number 810, the PDCCH may be associated with PUSCH scheduling. For example, the PDCCH may cause a CSI report, related to the A-CSI-RS transmission, to be scheduled. In some aspects, the CSI report may be scheduled for a time period after receipt of the A-CSI-RS transmission, for a time period after transmission of the scheduled uplink transmission, and/or the like. For example, and as shown in FIG. 8, the CSI report may be scheduled for transmission in a third slot (e.g., slot P+2).

As indicated above, FIG. 8 is provided as an example. Other examples may differ from what is described with respect to FIG. 8.

Figure 9:
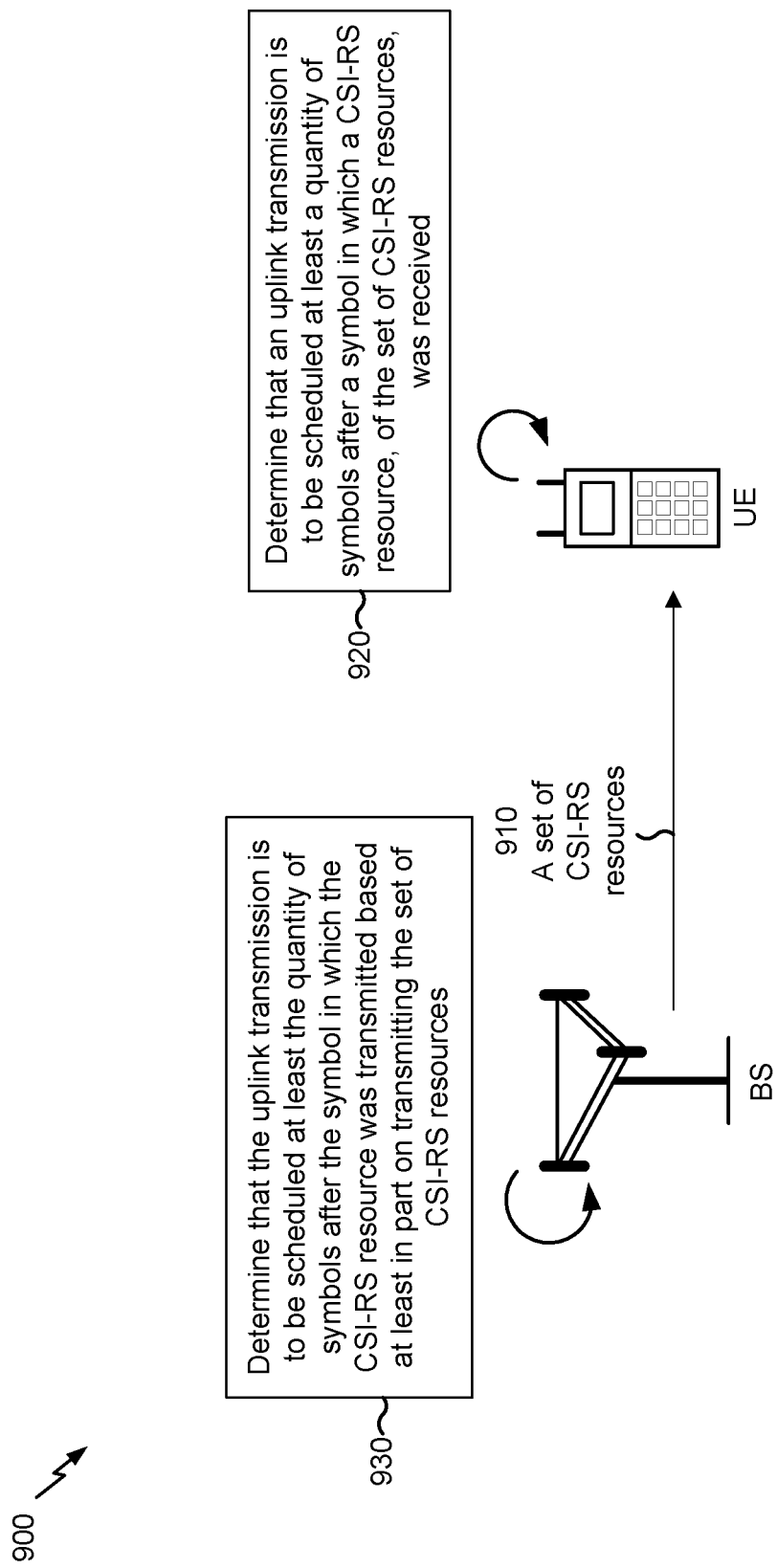
FIG. 9 is a diagram illustrating an example of determining uplink transmission timelines related to a set of CSI-RS resources that includes repetition, in accordance with various aspects of the present disclosure.

FIG. 9 is a diagram 900 illustrating an example of determining uplink transmission timelines related to a set of CSI-RS resources that includes repetition, in accordance with various aspects of the present disclosure. As shown in FIG. 9, example 900 includes a BS and a UE.

As shown by reference number 910, the BS may transmit, and the UE may receive, a set of CSI-RS resources. For example, the UE may receive the set of CSI-RS resources in association with a PDCCH transmission from the BS (e.g., the set of CSI-RS resources may be triggered by the PDCCH from the BS). In some aspects, the set of CSI-RS resources may be configured with repetition (e.g., multiple CSI-RS resources of a same transmit beam may be included in the set of CSI-RS resources). In some aspects, the set of CSI-RS resources may be a set of aperiodic CSI-RS (A-CSI-RS) resources. In some aspects, the set of CSI-RS resources may be a set of semi-persistent CSI-RS (SP-CSI-RS) resources. In some aspects, the set of CSI-RS resources may be a set of periodic CSI-RS (P-CSI-RS) resources.

As shown by reference number 920, the UE may determine that an uplink transmission is to be scheduled at least a quantity of symbols after a symbol in which a CSI-RS resource, of the set of CSI-RS resources, was received. For example, the UE may determine that the uplink transmission is to be scheduled at least the quantity of symbols after receiving the set of CSI-RS resources. In some aspects, an uplink transmission may be associated with the transmission of the set of CSI-RS resources. For example, the uplink transmission and the transmission of the set of CSI-RS resources may be spatially related.

In some aspects, the quantity of symbols may be based at least in part on a capability of the UE, may be based at least in part on a configuration by the UE, and/or the like. For example, the quantity of symbols may be based on a processing capability of the UE. As a specific example, in a situation where a first UE has more processing capability than a second UE, a first quantity of symbols for the first UE may include fewer symbols relative to a second quantity of symbols for the second UE, as the first UE may not need as much time to determine an uplink transmit beam as the second UE due to the higher processing capability of the first UE.

In some aspects, the BS may transmit information to the UE that indicates the quantity of symbols as a configuration. For example, during attachment and/or connection of the UE, the BS may identify the capability of the UE, and may send information to the UE that indicates the quantity of symbols. Additionally, or alternatively, during attachment and/or connection, the BS may transmit a schedule of quantities of symbols to the UE that the UE is to use to configure the quantity of symbols based on the capability of the UE. In this way, the quantity of symbols may be dynamic. In addition, in this way, the UE may determine that the uplink transmission is to be scheduled at least the quantity of symbols after the symbol based at least in part on receiving the configuration, based at least in part on the capability of the UE, and/or the like.

In some aspects, the quantity of symbols may be predetermined. For example, the quantity of symbols may be constant regardless of a capability of the UE, regardless of a configuration received from the BS, and/or the like. In some aspects, the UE may determine that the uplink transmission is to be scheduled a predetermined quantity of symbols after the symbol. This reduces or eliminates a need for the BS to transmit information identifying the quantity of symbols multiple times (e.g., for multiple uplink transmissions), thereby conserving processing resources of the UE and the BS, conserving network resources (e.g., bandwidth) between the UE and the BS, and/or the like.

In some implementations, the UE may determine a CSI-RS resource, of the set of CSI-RS resources, that is a most recently received CSI-RS resource relative to one or more other CSI-RS resources of the set of CSI-RS resources. For example, the UE may determine a CSI-RS resource that has a closest temporal proximity to an uplink transmission. In some aspects, the UE may determine that the uplink transmission is to be scheduled the predetermined quantity of symbols after the symbol in which the CSI-RS resource was received based at least in part on determining that the CSI-RS resource is the most recently received CSI-RS resource.

In some aspects, the UE may determine an uplink transmit beam for the uplink transmission. For example, the UE may determine an uplink transmit beam for the uplink transmission based at least in part on determining a downlink receive beam during a time period corresponding to the quantity of symbols after the symbol. As a specific example, the UE may have determined a downlink receive beam during the time period and may determine a corresponding uplink transmit beam as the uplink transmit beam for the uplink transmission.

In some aspects, if an uplink transmission is scheduled for transmission fewer than the quantity of symbols after the symbol in which the CSI-RS resource was received, the UE may determine an uplink transmit beam based on another transmission of the set of CSI-RS resources (e.g., a previous transmission of the set of CSI-RS resources). For example, the UE may determine an uplink transmit beam for the uplink transmission based at least in part on the second most recent transmission of the set of CSI-RS resources, the third most recent transmission of the set of CSI-RS resources, and/or the like rather than based at least in part on the most recent transmission of the set of CSI-RS resources (e.g., such that the uplink transmission is transmitted the quantity of symbols after receipt of the set of CSI-RS resources that was used to determine the uplink transmit beam). Additionally, or alternatively, the UE may use the most recently used uplink transmit beam for the transmission. This reduces or eliminates a need for the UE to delay transmission of an uplink transmission.

In some aspects, the UE may determine whether the set of CSI-RS resources is configured with the repetition prior to determining that the uplink transmission is to be scheduled at least a quantity of symbols after a symbol in which the CSI-RS was received. In some aspects, the UE may operate normally if the UE fails to determine that the set of CSI-RS resources is configured with the repetition. For example, the UE may not determine that the uplink transmission is to be scheduled for at least the quantity of symbols after the symbol in which the CSI-RS was received. Conversely, in some aspects, if the UE determines that the set of CSI-RS resources is configured with the repetition, then the UE may determine that the uplink transmission is to be scheduled at least the quantity of symbols after the symbol in which the CSI-RS resource was received.

As shown by reference number 930, the BS may determine that the uplink transmission is to be scheduled at least the quantity of symbols after the symbol in which the CSI-RS resource was transmitted based at least in part on transmitting the set of CSI-RS resources. For example, the BS may determine that an uplink transmission is to be scheduled at least the quantity of symbols after the symbol in which the CSI-RS resource was transmitted after transmitting the set of CSI-RS resources.

In some aspects, the BS may determine that the uplink transmission is to be scheduled at least the quantity of symbols after the symbol in a manner similar to that described with regard to the UE. For example, the BS may determine that the uplink transmission is to be scheduled at least the quantity of symbols after determining that the set of CSI-RS resources is configured with the repetition, based at least in part on determining that the set of CSI-RS resources was the most recently transmitted set of CSI-RS resources, and/or the like. In some aspects, the BS may determine an uplink receive beam for the uplink transmission based at least in part on determining a downlink transmit beam during a time period corresponding to the quantity of symbols after the symbol. For example, the BS may determine an uplink receive beam that corresponds to the downlink transmit beam.

In some aspects, the UE may transmit, and the BS may receive, the uplink transmission at least the quantity of symbols after the symbol. For example, the UE may transmit the uplink transmission via an uplink transmit beam that the UE determined and the BS may receive the uplink transmission via an uplink receive beam that the BS determined.

As indicated above, FIG. 9 is provided as an example. Other examples may differ from what is described with respect to FIG. 9.

Figure 10:
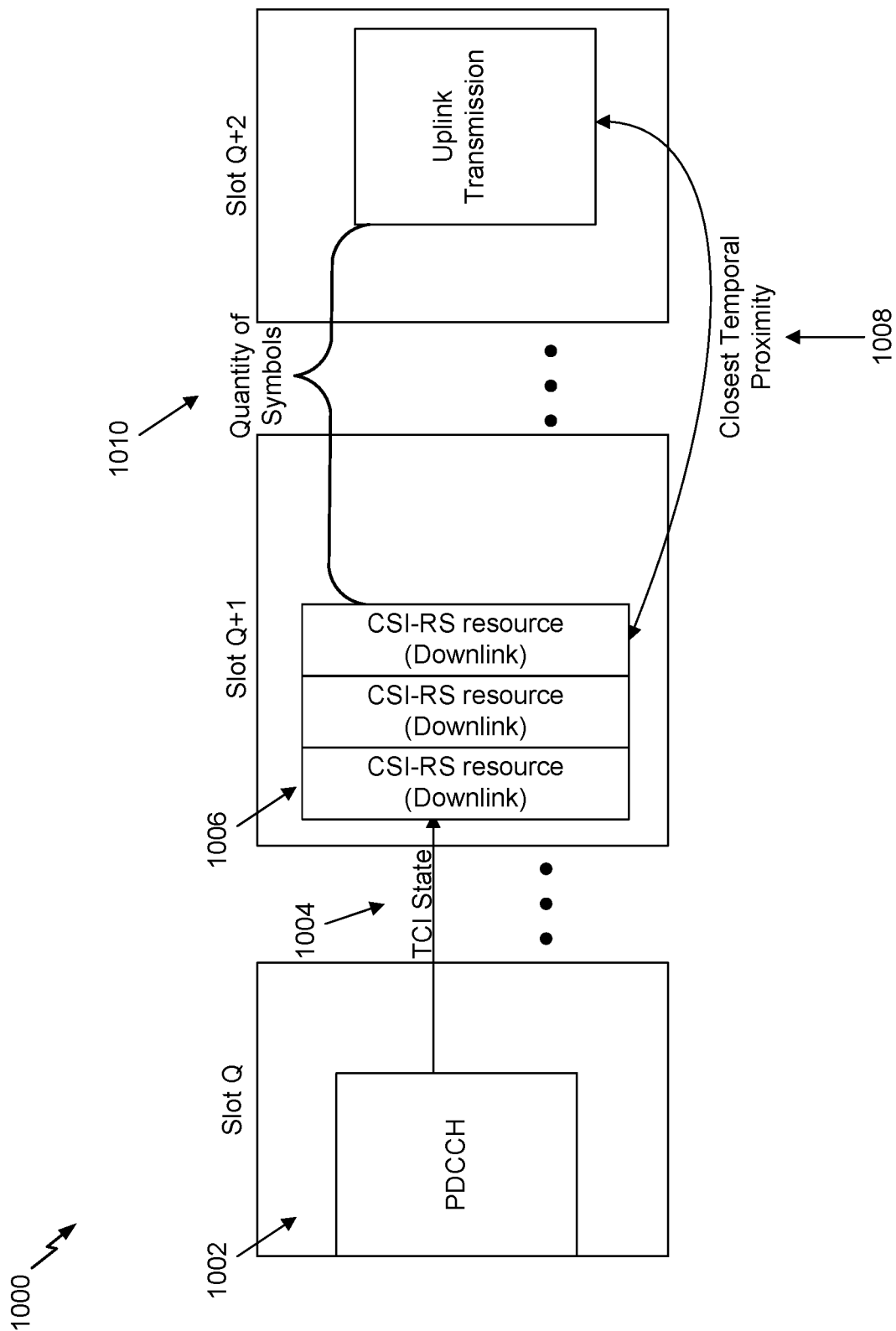
FIG. 10 is a diagram illustrating an example determining uplink transmission timelines related to a set of CSI-RS resources that includes repetition, in accordance with various aspects of the present disclosure.

FIG. 10 is a diagram 1000 illustrating an example of determining uplink transmission timelines related to a set of CSI-RS resources that includes repetition, in accordance with various aspects of the present disclosure.

As shown in in FIG. 10, and by reference number 1002, a UE may receive a PDCCH transmission in a first slot (e.g., slot Q). In some aspects, the PDCCH transmission may be similar to other PDCCH transmissions described elsewhere herein. As shown by reference number 1004, the PDCCH transmission may be associated with information that identifies a TCI state. In some aspects, the TCI state and/or the PDCCH may trigger transmission of a set of CSI-RS resources by a BS.

As shown by reference number 1006, the UE may receive the set of CSI-RS resources in a second slot (e.g., slot Q+1) (e.g., a set of CSI-RS resources that has multiple temporal repetition of the CSI-RS resources of the set of CSI-RS resources with the same TCI state), in a manner similar to that described elsewhere herein. In some aspects, the UE may receive the set of CSI-RS resources using a downlink receive beam. In some aspects, the UE may determine that the uplink transmission is to be scheduled at least a quantity of symbols after a symbol in which a CSI-RS resource, of the set of CSI-RS resources, was received, in a manner similar to that described elsewhere herein. As shown by reference number 1008, the UE may determine that the uplink transmission is to be scheduled such that the CSI-RS resource has a closest temporal proximity prior to the uplink transmission, but that the uplink transmission is to be scheduled at least a quantity of symbols after a symbol in which the CSI-RS resource was received.

As shown by reference number 1010, the UE may determine that the quantity of symbols is to cause the uplink transmission to be scheduled in a different slot than the slot in which the CSI-RS resource was received. In other examples, the UE may determine that the quantity of symbols is to cause the uplink transmission to be scheduled in the same slot in which the CSI-RS resource was received.

As indicated above, FIG. 10 is provided as an example. Other examples may differ from what is described with respect to FIG. 10.

Figure 11:
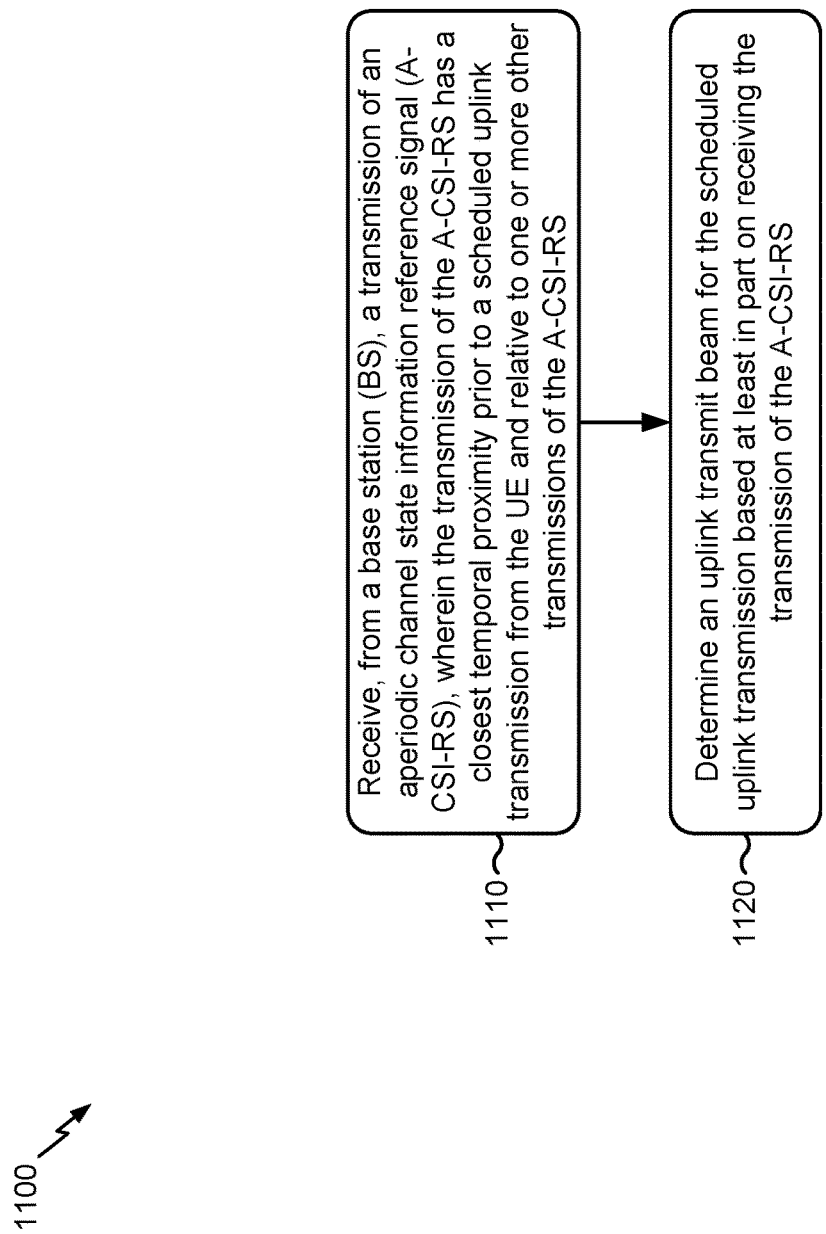
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120) performs a determination of uplink transmission timelines related to an A-CSI-RS.

As shown in FIG. 11, in some aspects, process 1100 may include receiving, from a base station (BS), a transmission of an aperiodic channel state information reference signal (A-CSI-RS), wherein the transmission of the A-CSI-RS has a closest temporal proximity prior to a scheduled uplink transmission from the UE and relative to one or more other transmissions of the A-CSI-RS (block 1110). For example, the UE (e.g., using antenna 252, controller/processor 280, memory 282, and/or the like) may receive, from a BS, a transmission of an A-CSI-RS, wherein the transmission of the A-CSI-RS has a closest temporal proximity prior to a scheduled uplink transmission from the UE and relative to one or more other transmissions of the A-CSI-RS, as described above.

As further shown in FIG. 11, in some aspects, process 1100 may include determining an uplink transmit beam for the scheduled uplink transmission based at least in part on receiving the transmission of the A-CSI-RS (block 1120). For example, the UE (e.g., using controller/processor 280) may determine an uplink transmit beam for the scheduled uplink transmission based at least in part on receiving the transmission of the A-CSI-RS, as described above.

Process 1100 may include additional aspects, such as any single aspect or any combination of aspects described below and/or in connection with one or more other processes described elsewhere herein.

In a first aspect, the UE may receive downlink control information (DCI) that includes a value in a channel state information (CSI) request field of the DCI, wherein the value in the CSI request field indicates a transmission configuration indication (TCI) state of the transmission of the A-CSI-RS, and may determining the uplink transmit beam based at least in part on: the value in the CSI request field, or the TCI state. In a second aspect, alone or in combination with the first aspect, the UE may receive the transmission of the A-CSI-RS in a same slot in which the scheduled uplink transmission is scheduled. In a third aspect, in combination with the second aspect, the UE may determine the uplink transmit beam during the same slot in which the transmission of the A-CSI-RS was received.

In a fourth aspect, alone or in combination with one or more of the first through third aspects, the UE may receive the transmission of the A-CSI-RS in a slot prior to another slot in which the scheduled uplink transmission is scheduled. In a fifth aspect, in combination with the fourth aspect, the UE may determine the uplink transmit beam during the slot, or may determine the uplink transmit beam during the other slot. In a sixth aspect, alone or in combination with one or more of the first through fifth aspects, the UE may determine the uplink transmit beam based at least in part on a downlink receive beam via which the UE received the transmission of the A-CSI-RS. In a seventh aspect, alone or in combination with one or more of the first through sixth aspects, the UE may transmit the scheduled uplink transmission via the uplink transmit beam based at least in part on determining the uplink transmit beam for the scheduled uplink transmission.

In an eighth aspect, alone or in combination with one or more of the first through seventh aspects, the UE may determine that the transmission of the A-CSI-RS and the one or more other transmissions of the A-CSI-RS were received within a time period based at least in part on receiving the transmission of the A-CSI-RS, wherein the transmission of the A-CSI-RS and the one or more other transmissions of the A-CSI-RS are associated with different transmission configuration indication (TCI) states, and may determine the uplink transmit beam based at least in part on determining that the transmission of the A-CSI-RS and the one or more other transmissions of the A-CSI-RS were received within the time period. In a ninth aspect, alone or in combination with one or more of the first through eighth aspects, the scheduled uplink transmission includes a physical uplink shared channel (PUSCH) transmission, a physical uplink control channel (PUCCH) transmission, or a sounding reference signal (SRS).

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
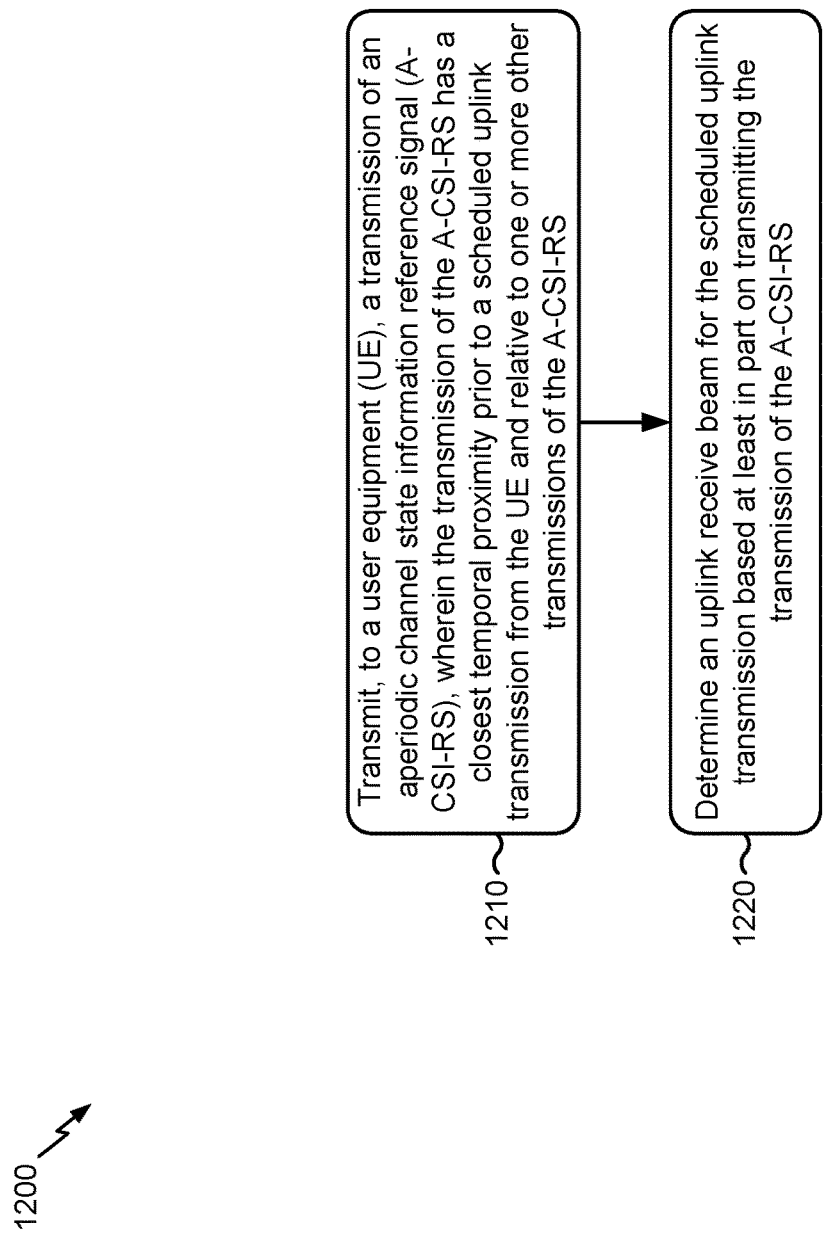
FIG. 12 is a diagram illustrating an example process performed, for example, by a base station, in accordance with various aspects of the present disclosure.

FIG. 12 is a diagram illustrating an example process 1200 performed, for example, by a BS, in accordance with various aspects of the present disclosure. Example process 1200 is an example where a BS (e.g., BS 110) performs a determination of uplink transmission timelines related to an A-CSI-RS.

As shown in FIG. 12, in some aspects, process 1200 may include transmitting, to a UE, a transmission of an A-CSI-RS, wherein the transmission of the A-CSI-RS has a closest temporal proximity prior to a scheduled uplink transmission from the UE and relative to one or more other transmissions of the A-CSI-RS (block 1210). For example, the BS (e.g., using antenna 234, controller/processor 240, and/or the like) may transmit, to a UE, a transmission of an A-CSI-RS, wherein the transmission of the A-CSI-RS has a closest temporal proximity prior to a scheduled uplink transmission from the UE and relative to one or more other transmissions of the A-CSI-RS, as described above.

As further shown in FIG. 12, in some aspects, process 1200 may include determining an uplink receive beam for the scheduled uplink transmission based at least in part on transmitting the transmission of the A-CSI-RS (block 1220). For example, the BS (e.g., using controller/processor 240) may determine an uplink receive beam for the scheduled uplink transmission based at least in part on transmitting the transmission of the A-CSI-RS, as described above.

Process 1200 may include additional aspects, such as any single aspect or any combination of aspects described below and/or in connection with one or more other processes described elsewhere herein.

In a first aspect, the BS may transmit downlink control information (DCI) that includes a value in a channel state information (CSI) request field of the DCI in association with the transmission of the A-CSI-RS, wherein the value in the CSI request field indicates a transmission configuration indication (TCI) state of the transmission of the A-CSI-RS, and may determine the uplink receive beam based at least in part on the value in the CSI request field, or the TCI state. In a second aspect, alone or in combination with the first aspect, the BS may transmit the transmission of the A-CSI-RS in a same slot in which the scheduled uplink transmission is scheduled. In a third aspect, in combination with the second aspect, the BS may determine the uplink receive beam during the same slot in which the scheduled uplink transmission is scheduled.

In a fourth aspect, alone or in combination with one or more of the first through third aspects, the BS may transmit the transmission of the A-CSI-RS in a slot prior to another slot in which the scheduled uplink transmission is scheduled. In a fifth aspect, in combination with the fourth aspect, the BS may determine the uplink receive beam during the slot, or may determine the uplink receive beam during the other slot. In a sixth aspect, alone or in combination with one or more of the first through fifth aspects, the BS may determine the uplink receive beam based at least in part on a downlink transmit beam via which the BS transmitted the transmission of the A-CSI-RS. In a seventh aspect, alone or in combination with one or more of the first through sixth aspects, the BS may receive the scheduled uplink transmission via the uplink receive beam based at least in part on determining the uplink receive beam for the scheduled uplink transmission.

In an eighth aspect, alone or in combination with one or more of the first through seventh aspects, the BS may determine that the transmission of the A-CSI-RS and the one or more other transmissions of the A-CSI-RS were transmitted within a time period based at least in part on transmitting the transmission of the A-CSI-RS, wherein the transmission of the A-CSI-RS and the one or more other transmissions of the A-CSI-RS are associated with different TCI states, and may determine the uplink receive beam based at least in part on determining that the transmission of the A-CSI-RS and the one or more other transmissions of the A-CSI-RS were transmitted within the time period. In a ninth aspect, alone or in combination with one or more of the first through eighth aspects, the scheduled uplink transmission includes a physical uplink shared channel (PUSCH) transmission, a physical uplink control channel (PUCCH) transmission, or a sounding reference signal (SRS).

Although FIG. 1200 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
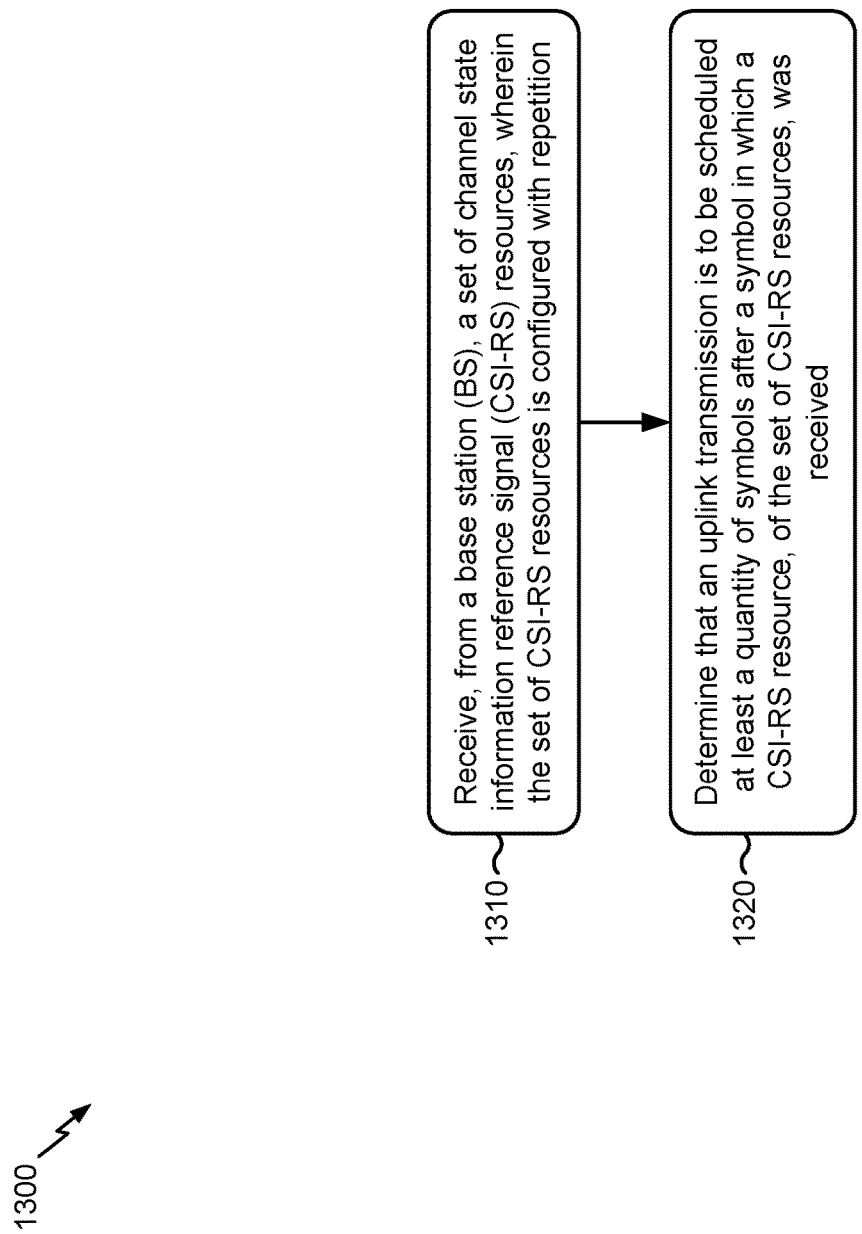
FIG. 13 is a diagram illustrating an example process performed, for example, by a user equipment, in accordance with various aspects of the present disclosure.

FIG. 13 is a diagram illustrating an example process 1300 performed, for example, by a UE, in accordance with various aspects of the present disclosure. Example process 1300 is an example where a UE (e.g., UE 120) performs a determination of uplink transmission timelines related to a set of CSI-RS resources that includes repetition.

As shown in FIG. 13, in some aspects, process 1300 may include receiving, from a BS, a set of CSI-RS resources, wherein the set of CSI-RS resources is configured with repetition (block 1310). For example, the UE (e.g., using antenna 252, controller/processor 280, memory 282, and/or the like) may receive, from a BS, a set of CSI-RS resources, wherein the set of CSI-RS resources is configured with repetition, as described above.

As further shown in FIG. 13, in some aspects, process 1300 may include determining that an uplink transmission is to be scheduled at least a quantity of symbols after a symbol in which a CSI-RS resource, of the set of CSI-RS resources, was received (block 1320). For example, the UE (e.g., using controller/processor 280) may determine that an uplink transmission is to be scheduled at least a quantity of symbols after a symbol in which a CSI-RS resource, of the set of CSI-RS resources, was received, as described above.

Process 1300 may include additional aspects, such as any single aspect or any combination of aspects described below and/or in connection with one or more other processes described elsewhere herein.

In a first aspect, the set of CSI-RS resources is a set of aperiodic CSI-RS (A-CSI-RS) resources. In a second aspect, alone or in combination with the first aspect, the set of CSI-RS resources is a set of semi-persistent CSI-RS (SP-CSI-RS) resources. In a third aspect, alone or in combination with one or more of the first and second aspects, the set of CSI-RS resources is a set of periodic CSI-RS (P-CSI-RS) resources. In a fourth aspect, alone or in combination with one or more of the first through third aspects, the quantity of symbols is based at least in part on a capability of the UE. In a fifth aspect, alone or in combination with one or more of the first through fourth aspects, the quantity of symbols is based at least in part on a configuration from the BS. In a sixth aspect, in combination with the fifth aspect, the UE may receive the configuration from the BS based at least in part on receiving the set of CSI-RS resources, and may determine that the uplink transmission is to be scheduled at least the quantity of symbols after the symbol based at least in part on receiving the configuration.

In a seventh aspect, alone or in combination with one or more of the first through sixth aspects, the quantity of symbols is a predetermined quantity of symbols. In an eighth aspect, in combination with the seventh aspect, the UE may determine that the uplink transmission is to be scheduled the predetermined quantity of symbols after the symbol. In a ninth aspect, in combination with the eighth aspect, the UE may determine that the uplink transmission is to be scheduled the predetermined quantity of symbols after the symbol in which the CSI-RS resource was received, wherein the CSI-RS resource is a most recently received CSI-RS resource relative to one or more other CSI-RS resources of the set of CSI-RS resources.

In a tenth aspect, alone or in combination with one or more of the first through ninth aspects, the UE may determine an uplink transmit beam for the uplink transmission based at least in part on determining a downlink receive beam during a time period corresponding to the quantity of symbols after the symbol. In an eleventh aspect, in combination with the tenth aspect, the UE may determine that another uplink transmission is not scheduled for at least the quantity of symbols after the symbol, wherein the uplink transmission and the other uplink transmission are different, and may determine another uplink transmit beam for the other uplink transmission based at least in part on determining that the other uplink transmission is not scheduled for at least the quantity of symbols after the symbol, wherein the uplink transmit beam and the other uplink transmit beam are different, wherein the other uplink transmit beam is determined based at least in part on a previous transmission of the set of CSI-RS resources, or a most recently used uplink transmit beam relative to other uplink transmit beams.

In a twelfth aspect, alone or in combination with one or more of the first through eleventh aspects, the UE may determine that the set of CSI-RS resources is configured with the repetition, and may determine that the uplink transmission is to be scheduled at least the quantity of symbols after the symbol based at least in part on determining that the set of CSI-RS resources is configured with the repetition. In a thirteenth aspect, alone or in combination with one or more of the first through twelfth aspects, the UE may transmit the uplink transmission to the BS at least the quantity of symbols after the symbol based at least in part on determining that the uplink transmission is to be scheduled at least the quantity of symbols after the symbol.

Although FIG. 13 shows example blocks of process 1300, in some aspects, process 13 may include additional blocks, fewer blocks, different blocks, or differently arranged blocks than those depicted in FIG. 13. Additionally, or alternatively, two or more of the blocks of process 1300 may be performed in parallel.

Figure 14:
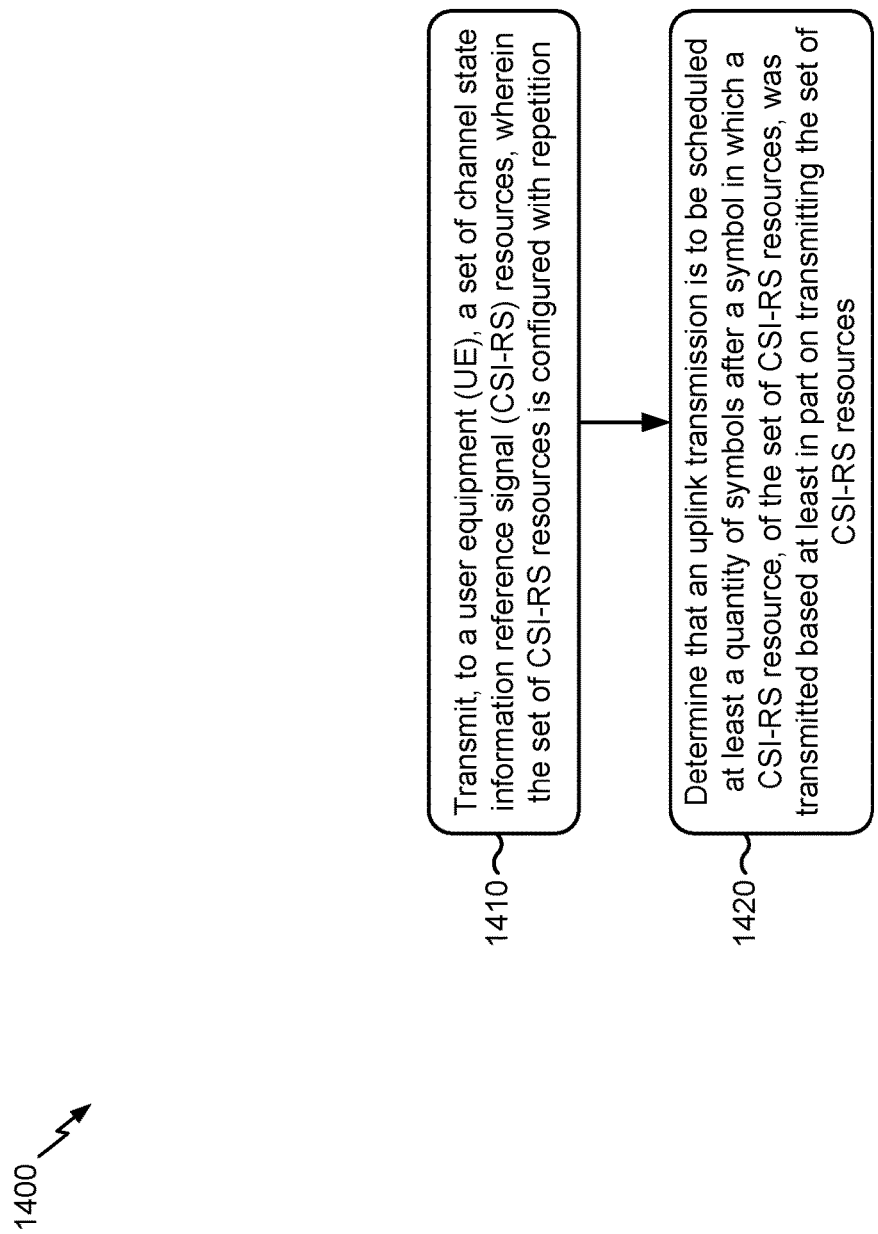
FIG. 14 is a diagram illustrating an example process performed, for example, by a base station, in accordance with various aspects of the present disclosure.

FIG. 14 is a diagram illustrating an example process 1400 performed, for example, by a BS, in accordance with various aspects of the present disclosure. Example process 1400 is an example where a BS (e.g., BS 110) performs a determination of uplink transmission timelines related to a set of CSI-RS resources that includes repetition.

As shown in FIG. 14, in some aspects, process 1400 may include transmitting, to a UE, a set of CSI-RS resources, wherein the set of CSI-RS resources is configured with repetition (block 1410). For example, the BS (e.g., using antenna 234, controller/processor 240, and/or the like) may transmit, to a UE, a set of CSI-RS resources, wherein the set of CSI-RS resources is configured with repetition, as described above.

As further shown in FIG. 14, in some aspects, process 1400 may include determining that an uplink transmission is to be scheduled at least a quantity of symbols after a symbol in which a CSI-RS resource, of the set of CSI-RS resources, was transmitted based at least in part on transmitting the set of CSI-RS resources (block 1420). For example, the BS (e.g., using controller/processor 240, and/or the like) may determine that an uplink transmission is to be scheduled at least a quantity of symbols after a symbol in which a CSI-RS resource, of the set of CSI-RS resources, was transmitted based at least in part on transmitting the set of CSI-RS resources, as described above.

Process 1400 may include additional aspects, such as any single aspect or any combination of aspects described below and/or in connection with one or more other processes described elsewhere herein.

In a first aspect, the set of CSI-RS resources is a set of aperiodic CSI-RS (A-CSI-RS) resources. In a second aspect, alone or in combination with the first aspect, the set of CSI-RS resources is a set of semi-persistent CSI-RS (SP-CSI-RS) resources. In a third aspect, alone or in combination with one or more of the first and second aspects, the set of CSI-RS resources is a set of periodic CSI-RS (P-CSI-RS) resources. In fourth aspect, alone or in combination with one or more of the first through third aspects, the quantity of symbols is based at least in part on a capability of the UE. In a fifth aspect, alone or in combination with one or more of the first through fourth aspects, the quantity of symbols is based at least in part on a configuration from the BS.

In a sixth aspect, in combination with the fifth aspect, the BS may transmit the configuration to the UE based at least in part on transmitting the set of CSI-RS resources, and may determine that the uplink transmission is to be scheduled at least the quantity of symbols after the symbol based at least in part on transmitting the configuration. In a seventh aspect, alone or in combination with one or more of the first through sixth aspects, the quantity of symbols is a predetermined quantity of symbols. In an eighth aspect, in combination with the seventh aspect, the BS may determine that the uplink transmission is to be scheduled the predetermined quantity of symbols after the symbol.

In a ninth aspect, in combination with the eighth aspect, the BS may determine that the uplink transmission is to be scheduled the predetermined quantity of symbols after the symbol in which the CSI-RS resource was transmitted, wherein the CSI-RS resource is a most recently transmitted CSI-RS resource relative to one or more other CSI-RS resources of the set of CSI-RS resources. In a tenth aspect, alone or in combination with one or more of the first through ninth aspects, the BS may determine an uplink receive beam for the uplink transmission based at least in part on determining a downlink transmit beam during a time period corresponding to the quantity of symbols after the symbol.

In an eleventh aspect, in combination with the tenth aspect, the BS may determine that another uplink transmission is not scheduled for at least the quantity of symbols after the symbol, wherein the uplink transmission and the other uplink transmission are different, and may determine another uplink receive beam for the other uplink transmission based at least in part on determining that the other uplink transmission is not scheduled for at least the quantity of symbols after the symbol, wherein the uplink receive beam and the other uplink receive beam are different, wherein the other uplink receive beam is determined based at least in part on a previous transmission of the set of CSI-RS resources, or a most recently used uplink receive beam relative to other uplink receive beams. In a twelfth aspect, alone or in combination with one or more of the first through eleventh aspects, the BS may determine that the set of CSI-RS resources is configured with the repetition, and may determine that the uplink transmission is to be scheduled at least the quantity of symbols after the symbol based at least in part on determining that the set of CSI-RS resources is configured with the repetition. In a thirteenth aspect, alone or in combination with one or more of the first through twelfth aspects, the BS may receive the uplink transmission at least the quantity of symbols after the symbol based at least in part on determining that the uplink transmission is to be scheduled at least the quantity of symbols after the symbol.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
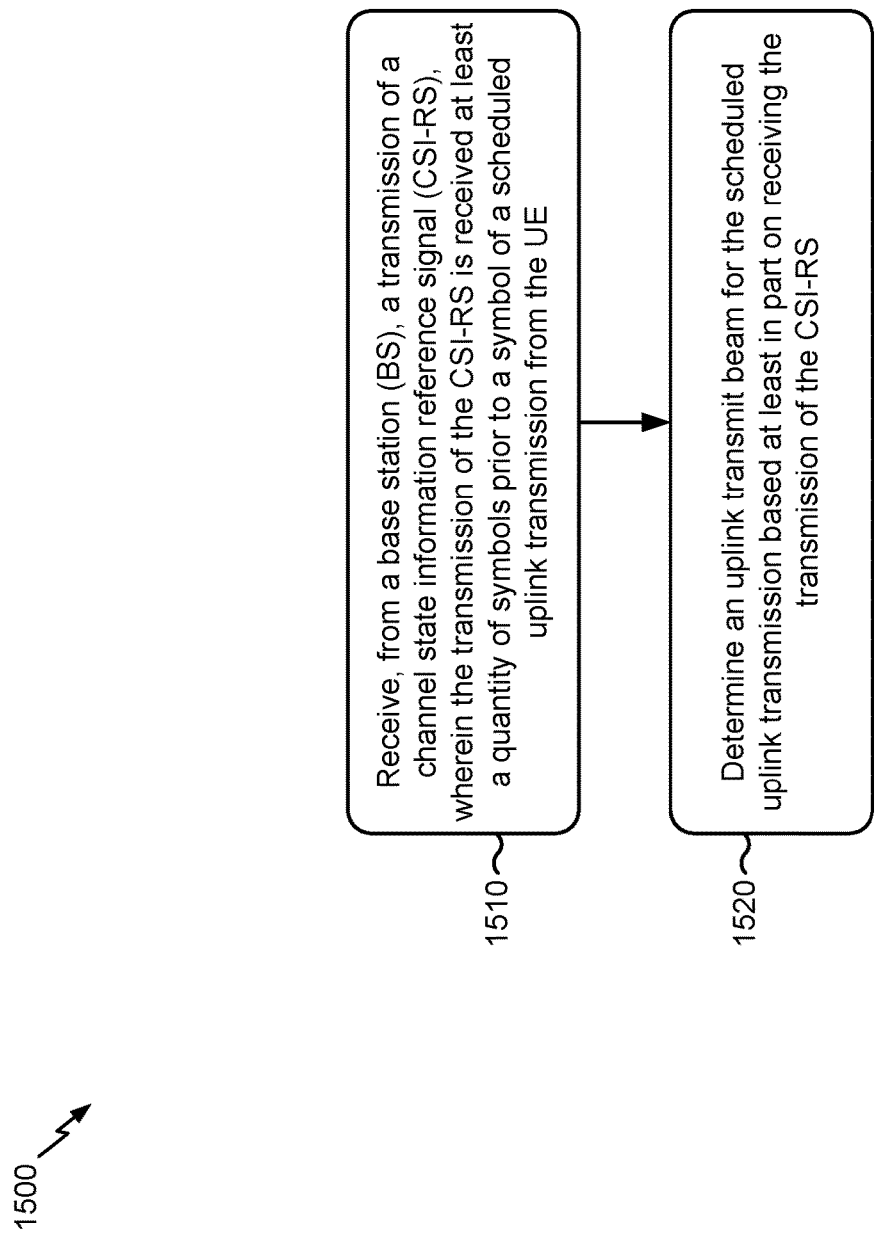
FIG. 15 is a diagram illustrating an example process performed, for example, by a user equipment, in accordance with various aspects of the present disclosure.

FIG. 15 is a diagram illustrating an example process 1500 performed, for example, by a UE, in accordance with various aspects of the present disclosure. Example process 1500 is an example where a UE (e.g., UE 120 and/or the like) performs operations associated with techniques and apparatuses for determining uplink transmission timelines related to a CSI-RS.

As shown in FIG. 15, in some aspects, process 1500 may include receiving, from a BS, a transmission of a CSI-RS, wherein the transmission of the CSI-RS is received at least a quantity of symbols prior to a symbol of a scheduled uplink transmission from the UE (block 1510). For example, the UE (e.g., using antenna 252, DEMOD 254, MIMO detector 256, receive processor 258, controller/processor 280, and/or the like) may receive, from a BS, a transmission of a CSI-RS, as described above. In some aspects, the transmission of the CSI-RS is received at least a quantity of symbols prior to a symbol of a scheduled uplink transmission from the UE.

As further shown in FIG. 15, in some aspects, process 1500 may include determining an uplink transmit beam for the scheduled uplink transmission based at least in part on receiving the transmission of the CSI-RS (block 1520). For example, the UE (e.g., using controller/processor 280, and/or the like) may determine an uplink transmit beam for the scheduled uplink transmission based at least in part on receiving the transmission of the CSI-RS, as described above.

Process 1500 may include additional aspects, such as any single aspect or any combination of aspects described below and/or in connection with one or more other processes described elsewhere herein.

In a first aspect, the CSI-RS is one of an aperiodic CSI-RS (A-CSI-RS), a semi-persistent CSI-RS (SP-CSI-RS), or a periodic CSI-RS (P-CSI-RS). In a second aspect, alone or in combination with the first aspect, the UE may receive downlink control information (DCI) that includes a value in a channel state information (CSI) request field of the DCI, wherein the value in the CSI request field indicates a transmission configuration indication (TCI) state of the transmission of the CSI-RS, and may determine the uplink transmit beam based at least in part on: the value in the CSI request field, or the TCI state.

In a third aspect, alone or in combination with one or more of the first and second aspects, the UE may receive the transmission of the CSI-RS in a same slot in which the scheduled uplink transmission is scheduled. In a fourth aspect, in combination with the third aspect, the UE may determine the uplink transmit beam during the same slot in which the transmission of the CSI-RS was received.

In a fifth aspect, alone or in combination with one or more of the first through fourth aspects, the UE may receive the transmission of the CSI-RS in a slot prior to another slot in which the scheduled uplink transmission is scheduled. In a sixth aspect, in combination with the fifth aspect, the UE may determine the uplink transmit beam during the slot in which the transmission of the CSI-RS is received, or may determine the uplink transmit beam during the other slot in which the scheduled uplink transmission is scheduled. In a seventh aspect, alone or in combination with one or more of the first through sixth aspects, the UE may determine the uplink transmit beam based at least in part on a downlink receive beam via which the UE received the transmission of the CSI-RS.

In an eighth aspect, alone or in combination with one or more of the first through seventh aspects, the UE may transmit the scheduled uplink transmission via the determined uplink transmit beam. In a ninth aspect, alone or in combination with one or more of the first through eighth aspects, the UE may determine that the transmission of the CSI-RS and one or more other transmissions of the CSI-RS were received within a time period based at least in part on receiving the transmission of the CSI-RS, wherein the transmission of the CSI-RS and the one or more other transmissions of the CSI-RS are associated with different TCI states, and may determine the uplink transmit beam based at least in part on determining that the transmission of the CSI-RS and the one or more other transmissions of the CSI-RS were received within the time period.

In a tenth aspect, alone or in combination with one or more of the first through ninth aspects, the scheduled uplink transmission includes a physical uplink shared channel (PUSCH) transmission, a physical uplink control channel (PUCCH) transmission, or a sounding reference signal (SRS). In an eleventh aspect, alone or in combination with one or more of the first through tenth aspects, the CSI-RS is configured with repetition.

In a twelfth aspect, alone or in combination with one or more of the first through eleventh aspects, the quantity of symbols is based at least in part on at least one of a capability of the UE, or a configuration from the BS. In a thirteenth aspect, in combination with the twelfth aspect, the UE may receive, in association with receiving the CSI-RS, the configuration from the BS based at least in part on receiving the CSI-RS, and may determine, prior to determining the uplink transmit beam, that an uplink transmission is to be scheduled at least the quantity of symbols after the transmission of the CSI-RS is received based at least in part on receiving the configuration from the BS, wherein scheduling of the uplink transmission forms the scheduled uplink transmission.

In a fourteenth aspect, alone or in combination with one or more of the first through thirteenth aspects, the quantity of symbols is a predetermined quantity of symbols. In a fifteenth aspect, in combination with the fourteenth aspect, the UE may determine, prior to determining the uplink transmit beam, that an uplink transmission is to be scheduled the predetermined quantity of symbols after the symbol, wherein scheduling the uplink transmission forms the scheduled uplink transmission.

In a sixteenth aspect, alone or in combination with one or more of the first through fifteenth aspects, the UE may determine that another scheduled uplink transmission is not scheduled for at least the quantity of symbols after the symbol, wherein the scheduled uplink transmission and the other scheduled uplink transmission are different, and may determine another uplink transmit beam for the other scheduled uplink transmission based at least in part on determining that the other scheduled uplink transmission is not scheduled for at least the quantity of symbols after the symbol, wherein the uplink transmit beam and the other uplink transmit beam are different, wherein the other uplink transmit beam is determined based at least in part on a previous transmission of the CSI-RS, or a most recently used uplink transmit beam relative to other uplink transmit beams. In a seventeenth aspect, alone or in combination with one or more of the first through sixteenth aspects, the UE may transmit the scheduled uplink transmission to the BS at least the quantity of symbols after receiving the transmission of the CSI-RS based at least in part on determining that an uplink transmission is to be scheduled, wherein scheduling the uplink transmission forms the scheduled uplink transmission.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

FIG. 16 is a diagram illustrating an example process 1600 performed, for example, by a base station (BS), in accordance with various aspects of the present disclosure. Example process 1600 is an example where a BS (e.g., BS 110 and/or the like) performs operations associated with techniques and apparatuses for determining uplink transmission timelines related to a CSI-RS.

As shown in FIG. 16, in some aspects, process 1600 may include transmitting, to a UE, a transmission of a CSI-RS wherein the transmission of the CSI-RS is transmitted at least a quantity of symbols prior to a symbol of a scheduled uplink transmission from the UE (block 1610). For example, the BS (e.g., using controller/processor 240, transmit processor 220, TX MIMO processor 230, MOD 232, antenna 234, and/or the like) may transmit, to a UE, a transmission of a CSI-RS, as described above. In some aspects, the transmission of the CSI-RS is transmitted at least a quantity of symbols prior to a symbol of a scheduled uplink transmission from the UE.

As further shown in FIG. 16, in some aspects, process 1600 may include determining an uplink receive beam for the scheduled uplink transmission based at least in part on transmitting the transmission of the CSI-RS (block 1620). For example, the BS (e.g., using controller/processor 240 and/or the like) may determine an uplink receive beam for the scheduled uplink transmission based at least in part on transmitting the transmission of the CSI-RS, as described above.

Process 1600 may include additional aspects, such as any single aspect or any combination of aspects described below and/or in connection with one or more other processes described elsewhere herein.

In a first aspect, the CSI-RS is one of an aperiodic CSI-RS (A-CSI-RS), a semi-persistent CSI-RS (SP-CSI-RS), or a periodic CSI-RS (P-CSI-RS). In a second aspect, alone or in combination with the first aspect, the BS may transmit downlink control information (DCI) that includes a value in a channel state information (CSI) request field of the DCI in association with the transmission of the CSI-RS, wherein the value in the CSI request field indicates a transmission configuration indication (TCI) state of the transmission of the CSI-RS, and may determine the uplink receive beam based at least in part on the value in the CSI request field, or the TCI state.

In a third aspect, alone or in combination with one or more of the first and second aspects, the BS may transmit the transmission of the CSI-RS in a same slot in which the scheduled uplink transmission is scheduled. In a fourth aspect, in combination with the third aspect, the BS may determine the uplink receive beam during the same slot in which the scheduled uplink transmission is scheduled.

In a fifth aspect, alone or in combination with one or more of the first through fourth aspects, the BS may transmit the transmission of the CSI-RS in a slot prior to another slot in which the scheduled uplink transmission is scheduled. In a sixth aspect, in combination with the fifth aspect, the BS may determine the uplink receive beam during the slot in which the transmission of the CSI-RS is transmitted, or may determine the uplink receive beam during the other slot in which the scheduled uplink transmission is scheduled.

In a seventh aspect, alone or in combination with one or more of the first through sixth aspects, the BS may determine the uplink receive beam based at least in part on a downlink transmit beam via which the BS transmitted the transmission of the CSI-RS. In an eighth aspect, alone or in combination with one or more of the first through seventh aspects, the BS may receive the scheduled uplink transmission via the determined uplink receive beam.

In a ninth aspect, alone or in combination with one or more of the first through eighth aspects, the BS may determine that the transmission of the CSI-RS and one or more other transmissions of the CSI-RS were transmitted within a time period based at least in part on transmitting the transmission of the CSI-RS, wherein the transmission of the CSI-RS and the one or more other transmissions of the CSI-RS are associated with different transmission configuration indication (TCI) states, and may determine the uplink receive beam based at least in part on determining that the transmission of the CSI-RS and the one or more other transmissions of the CSI-RS were transmitted within the time period. In a tenth aspect, alone or in combination with one or more of the first through ninth aspects, the scheduled uplink transmission includes a physical uplink shared channel (PUSCH) transmission, a physical uplink control channel (PUCCH) transmission, or a sounding reference signal (SRS).

In an eleventh aspect, alone or in combination with one or more of the first through tenth aspects, the CSI-RS is configured with repetition. In a twelfth aspect, alone or in combination with one or more of the first through eleventh aspects, the quantity of symbols is based at least in part on at least one of: a capability of the UE, or a configuration from the BS. In a thirteenth aspect, in combination with the twelfth aspect, the BS may transmit the configuration to the UE based at least in part on transmitting the CSI-RS, and may determine, prior to determining the uplink receive beam, that an uplink transmission is to be scheduled at least the quantity of symbols after the transmission of the CSI-RS is transmitted based at least in part on transmitting the configuration to the UE, wherein scheduling the uplink transmission forms the scheduled uplink transmission.

In a fourteenth aspect, alone or in combination with one or more of the first through thirteenth aspects, the quantity of symbols is a predetermined quantity of symbols. In a fifteenth aspect, in combination with the fourteenth aspect, the BS may determine, prior to determining the uplink transmit beam, that an uplink transmission is to be scheduled the predetermined quantity of symbols after the symbol, wherein scheduling the uplink transmission forms the scheduled uplink transmission.

In a sixteenth aspect, alone or in combination with one or more of the first through fifteenth aspects, the BS may determine that another scheduled uplink transmission is not scheduled for at least the quantity of symbols after the symbol, wherein the scheduled uplink transmission and the other scheduled uplink transmission are different, and may determine another uplink receive beam for the other scheduled uplink transmission based at least in part on determining that the other scheduled uplink transmission is not scheduled for at least the quantity of symbols after the symbol, wherein the uplink receive beam and the other uplink receive beam are different, wherein the other uplink receive beam is determined based at least in part on a previous transmission of the CSI-RS, or a most recently used uplink receive beam relative to other uplink receive beams. In a seventeenth aspect, alone or in combination with one or more of the first through sixteenth aspects, the BS may receive the scheduled uplink transmission at least the quantity of symbols after receiving the transmission of the CSI-RS based at least in part on determining that an uplink transmission is to be scheduled, wherein scheduling the uplink transmission forms the scheduled uplink transmission.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a "processor" is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station (BS), a transmission of a channel state information reference signal (CSI-RS), wherein the transmission of the CSI-RS is received at least a quantity of symbols prior to a symbol of a scheduled uplink transmission from the UE;
   receiving downlink control information (DCI) that includes a value in a channel state information (CSI) request field of the DCI, wherein the value in the CSI request field indicates a transmission configuration indication (TCI) state of the transmission of the CSI-RS; and
   determining an uplink transmit beam for the scheduled uplink transmission based at least in part on receiving the transmission of the CSI-RS and the TCI state of the transmission of the CSI-RS, wherein the transmission of the CSI-RS has a closest temporal proximity prior to the scheduled uplink transmission relative to one or more other transmissions of the CSI-RS.

2. The method of claim 1, wherein the CSI-RS is one of:
   an aperiodic CSI-RS (A-CSI-RS),
   a semi-persistent CSI-RS (SP-CSI-RS), or
   a periodic CSI-RS (P-CSI-RS).

3. The method of claim 1, wherein the CSI-RS is configured with repetition.

4. The method of claim 1, wherein receiving the transmission of the CSI-RS comprises:
   receiving the transmission of the CSI-RS in a same slot in which the scheduled uplink transmission is scheduled.

5. The method of claim 4, wherein determining the uplink transmit beam comprises:
   determining the uplink transmit beam during the same slot in which the transmission of the CSI-RS was received.

6. The method of claim 1, wherein receiving the transmission of the CSI-RS comprises:
   receiving the transmission of the CSI-RS in a slot prior to another slot in which the scheduled uplink transmission is scheduled.

7. The method of claim 6, wherein determining the uplink transmit beam comprises:
   determining the uplink transmit beam during the slot in which the transmission of the CSI-RS is received, or
   determining the uplink transmit beam during the other slot in which the scheduled uplink transmission is scheduled.

8. The method of claim 1, wherein determining the uplink transmit beam comprises:
   determining the uplink transmit beam based at least in part on a downlink receive beam via which the UE received the transmission of the CSI-RS.

9. The method of claim 1, further comprising:
   transmitting the scheduled uplink transmission via the determined uplink transmit beam.

10. The method of claim 1, further comprising:
    determining that the transmission of the CSI-RS and the one or more other transmissions of the CSI-RS were received within a time period based at least in part on receiving the transmission of the CSI-RS, wherein the transmission of the CSI-RS and the one or more other transmissions of the CSI-RS are associated with different TCI states; and
    wherein determining the uplink transmit beam comprises:
    determining the uplink transmit beam based at least in part on determining that the transmission of the CSI-RS and the one or more other transmissions of the CSI-RS were received within the time period.

11. The method of claim 1, wherein the scheduled uplink transmission includes:
   a physical uplink shared channel (PUSCH) transmission,
   a physical uplink control channel (PUCCH) transmission, or
   a sounding reference signal (SRS).

12. The method of claim 1, wherein the quantity of symbols is based at least in part on at least one of:
   a capability of the UE, or
   a configuration from the BS.

13. The method of claim 12, further comprising:
   receiving, in association with receiving the CSI-RS, the configuration from the BS based at least in part on receiving the CSI-RS; and
   determining, prior to determining the uplink transmit beam, that an uplink transmission is to be scheduled at least the quantity of symbols after the transmission of the CSI-RS is received based at least in part on receiving the configuration from the BS,
      wherein scheduling of the uplink transmission forms the scheduled uplink transmission.

14. The method of claim 1, wherein the quantity of symbols is a predetermined quantity of symbols.

15. The method of claim 14, further comprising:
   determining, prior to determining the uplink transmit beam, that an uplink transmission is to be scheduled the predetermined quantity of symbols after the symbol,
      wherein scheduling the uplink transmission forms the scheduled uplink transmission.

16. The method of claim 1, further comprising:
   determining that another scheduled uplink transmission is not scheduled for at least the quantity of symbols after the symbol,
      wherein the scheduled uplink transmission and the other scheduled uplink transmission are different; and
   determining another uplink transmit beam for the other scheduled uplink transmission based at least in part on determining that the other scheduled uplink transmission is not scheduled for at least the quantity of symbols after the symbol,
      wherein the uplink transmit beam and the other uplink transmit beam are different,
      wherein the other uplink transmit beam is determined based at least in part on:
         a previous transmission of the CSI-RS, or
         a most recently used uplink transmit beam relative to other uplink transmit beams.

17. The method of claim 1, further comprising:
   transmitting the scheduled uplink transmission to the BS at least the quantity of symbols after receiving the transmission of the CSI-RS based at least in part on determining that an uplink transmission is to be scheduled,
      wherein scheduling the uplink transmission forms the scheduled uplink transmission.

18. A method of wireless communication performed by a base station (BS), comprising:
   transmitting, to a user equipment (UE), a transmission of a channel state information reference signal (CSI-RS), wherein the transmission of the CSI-RS is transmitted at least a quantity of symbols prior to a symbol of a scheduled uplink transmission from the UE;
   transmitting downlink control information (DCI) that includes a value in a channel state information (CSI) request field of the DCI,
      wherein the value in the CSI request field indicates a transmission configuration indication (TCI) state of the transmission of the CSI-RS; and
   determining an uplink receive beam for the scheduled uplink transmission based at least in part on transmitting the transmission of the CSI-RS and the TCI state of the transmission of the CSI-RS,
      wherein the transmission of the CSI-RS has a closest temporal proximity prior to the scheduled uplink transmission relative to one or more other transmissions of the CSI-RS.

19. The method of claim 18, wherein the CSI-RS is one of:
   an aperiodic CSI-RS (A-CSI-RS),
   a semi-persistent CSI-RS (SP-CSI-RS), or
   a periodic CSI-RS (P-CSI-RS).

20. The method of claim 18, wherein the CSI-RS is configured with repetition.

21. The method of claim 18, wherein transmitting the transmission of the CSI-RS comprises:
   transmitting the transmission of the CSI-RS in a same slot in which the scheduled uplink transmission is scheduled.

22. The method of claim 21, wherein determining the uplink receive beam comprises:
   determining the uplink receive beam during the same slot in which the scheduled uplink transmission is scheduled.

23. The method of claim 18, wherein transmitting the transmission of the CSI-RS comprises:
   transmitting the transmission of the CSI-RS in a slot prior to another slot in which the scheduled uplink transmission is scheduled.

24. The method of claim 23, wherein determining the uplink receive beam comprises:
   determining the uplink receive beam during the slot in which the transmission of the CSI-RS is transmitted, or
   determining the uplink receive beam during the other slot in which the scheduled uplink transmission is scheduled.

25. The method of claim 18, wherein determining the uplink receive beam comprises:
   determining the uplink receive beam based at least in part on a downlink transmit beam via which the BS transmitted the transmission of the CSI-RS.

26. The method of claim 18, further comprising:
   receiving the scheduled uplink transmission via the determined uplink receive beam.

27. The method of claim 18, further comprising:
   determining that the transmission of the CSI-RS and the one or more other transmissions of the CSI-RS were transmitted within a time period based at least in part on transmitting the transmission of the CSI-RS,
      wherein the transmission of the CSI-RS and the one or more other transmissions of the CSI-RS are associated with different TCI states; and
   wherein determining the uplink receive beam comprises:
      determining the uplink receive beam based at least in part on determining that the transmission of the CSI-RS and the one or more other transmissions of the CSI-RS were transmitted within the time period.

28. The method of claim 18, wherein the scheduled uplink transmission includes:
   a physical uplink shared channel (PUSCH) transmission,
   a physical uplink control channel (PUCCH) transmission, or
   a sounding reference signal (SRS).

29. The method of claim 18, wherein the quantity of symbols is based at least in part on at least one of:
   a capability of the UE, or
   a configuration from the BS.

30. The method of claim 29, further comprising:
   transmitting the configuration to the UE based at least in part on transmitting the CSI-RS; and
   determining, prior to determining the uplink receive beam, that an uplink transmission is to be scheduled at least the quantity of symbols after the transmission of the CSI-RS is transmitted based at least in part on transmitting the configuration to the UE,
      wherein scheduling the uplink transmission forms the scheduled uplink transmission.

31. The method of claim 18, wherein the quantity of symbols is a predetermined quantity of symbols.

32. The method of claim 31, further comprising:
   determining, prior to determining the uplink receive beam, that an uplink transmission is to be scheduled the predetermined quantity of symbols after the symbol,
      wherein scheduling the uplink transmission forms the scheduled uplink transmission.

33. The method of claim 18, further comprising:
   determining that another scheduled uplink transmission is not scheduled for at least the quantity of symbols after the symbol,
      wherein the scheduled uplink transmission and the other scheduled uplink transmission are different; and
   determining another uplink receive beam for the other scheduled uplink transmission based at least in part on determining that the other scheduled uplink transmission is not scheduled for at least the quantity of symbols after the symbol,
      wherein the uplink receive beam and the other uplink receive beam are different,
      wherein the other uplink receive beam is determined based at least in part on:
         a previous transmission of the CSI-RS, or
         a most recently used uplink receive beam relative to other uplink receive beams.

34. The method of claim 18, further comprising:
   receiving the scheduled uplink transmission at least the quantity of symbols after receiving the transmission of the CSI-RS based at least in part on determining that an uplink transmission is to be scheduled,
      wherein scheduling the uplink transmission forms the scheduled uplink transmission.

35. A user equipment (UE) for wireless communication, comprising:
   a memory; and
   one or more processors coupled to the memory, the memory and the one or more processors configured to:
      receive, from a base station (BS), a transmission of a channel state information reference signal (CSI-RS), wherein the transmission of the CSI-RS is received at least a quantity of symbols prior to a symbol of a scheduled uplink transmission from the UE;
      receive downlink control information (DCI) that includes a value in a channel state information (CSI) request field of the DCI,
         wherein the value in the CSI request field indicates a transmission configuration indication (TCI) state of the transmission of the CSI-RS; and
      determine an uplink transmit beam for the scheduled uplink transmission based at least in part on receiving the transmission of the CSI-RS and the TCI state of the transmission of the CSI-RS,
         wherein the transmission of the CSI-RS has a closest temporal proximity prior to the scheduled uplink transmission relative to one or more other transmissions of the CSI-RS.

36. The UE of claim 35, wherein the one or more processors, when determining the uplink transmit beam, are configured to:
   determine the uplink transmit beam during a same slot in which the transmission of the CSI-RS was received.

37. The UE of claim 35, wherein the one or more processors, when receiving the transmission of the CSI-RS, are configured to:
   receive the transmission of the CSI-RS in a slot prior to another slot in which the scheduled uplink transmission is scheduled.

38. The UE of claim 37, wherein the one or more processors, when determining the uplink transmit beam, are configured to:
   determine the uplink transmit beam during the slot in which the transmission of the CSI-RS is received, or
   determine the uplink transmit beam during the other slot in which the scheduled uplink transmission is scheduled.

39. The UE of claim 35, wherein the one or more processors, when determining the uplink transmit beam, are configured to:
   determine the uplink transmit beam based at least in part on a downlink receive beam via which the UE received the transmission of the CSI-RS.

40. The UE of claim 35, wherein the one or more processors are further configured to:
   determine that the transmission of the CSI-RS and the one or more other transmissions of the CSI-RS were received within a time period based at least in part on receiving the transmission of the CSI-RS,
      wherein the transmission of the CSI-RS and the one or more other transmissions of the CSI-RS are associated with different TCI states; and
   wherein the one or more processors, when determining the uplink transmit beam, are configured to:
      determine the uplink transmit beam based at least in part on determining that the transmission of the CSI-RS and the one or more other transmissions of the CSI-RS were received within the time period.

41. The UE of claim 35, wherein the one or more processors are further configured to:
   receive, in association with receiving the CSI-RS, a configuration from the BS based at least in part on receiving the CSI-RS; and
   determine, prior to determining the uplink transmit beam, that an uplink transmission is to be scheduled at least the quantity of symbols after the transmission of the CSI-RS is received based at least in part on receiving the configuration from the BS,
      wherein scheduling of the uplink transmission forms the scheduled uplink transmission.

42. The UE of claim 35, wherein the one or more processors are further configured to:
   determine that another scheduled uplink transmission is not scheduled for at least the quantity of symbols after the symbol,
      wherein the scheduled uplink transmission and the other scheduled uplink transmission are different; and determine another uplink transmit beam for the other scheduled uplink transmission based at least in part on determining that the other scheduled uplink transmission is not scheduled for at least the quantity of symbols after the symbol,
wherein the uplink transmit beam and the other uplink transmit beam are different,
wherein the other uplink transmit beam is determined based at least in part on:
a previous transmission of the CSI-RS, or
a most recently used uplink transmit beam relative to other uplink transmit beams.

43. The UE of claim 35, wherein the one or more processors are further configured to:
transmit the scheduled uplink transmission to the BS at least the quantity of symbols after receiving the transmission of the CSI-RS based at least in part on determining that an uplink transmission is to be scheduled,
wherein scheduling the uplink transmission forms the scheduled uplink transmission.

44. The UE of claim 35, wherein, wherein the CSI-RS is one of:
an aperiodic CSI-RS (A-CSI-RS),
a semi-persistent CSI-RS (SP-CSI-RS), or
a periodic CSI-RS (P-CSI-RS).

45. The UE of claim 35, wherein the CSI-RS is configured with repetition.

46. A base station (BS) for wireless communication, comprising:
a memory; and
one or more processors coupled to the memory, the memory and the one or more processors configured to:
transmit, to a user equipment (UE), a transmission of a channel state information reference signal (CSI-RS),
wherein the transmission of the CSI-RS is transmitted at least a quantity of symbols prior to a symbol of a scheduled uplink transmission from the UE;
transmit downlink control information (DCI) that includes a value in a channel state information (CSI) request field of the DCI,
wherein the value in the CSI request field indicates a transmission configuration indication (TCI) state of the transmission of the CSI-RS; and
determine an uplink receive beam for the scheduled uplink transmission based at least in part on transmitting the transmission of the CSI-RS and the TCI state of the transmission of the CSI-RS,
wherein the transmission of the CSI-RS has a closest temporal proximity prior to the scheduled uplink transmission relative to other transmissions of the CSI-RS.

47. The BS of claim 46, wherein the one or more processors, when determining the uplink receive beam, are configured to:
determine the uplink receive beam during a same slot in which the scheduled uplink transmission is scheduled.

48. The BS of claim 46, wherein the one or more processors, when transmitting the transmission of the CSI-RS, are configured to:
transmit the transmission of the CSI-RS in a slot prior to another slot in which the scheduled uplink transmission is scheduled.

49. The BS of claim 48, wherein the one or more processors, when determining the uplink receive beam, are configured to:
determine the uplink receive beam during the slot in which the transmission of the CSI-RS is transmitted, or
determine the uplink receive beam during the other slot in which the scheduled uplink transmission is scheduled.

50. The BS of claim 46, wherein the one or more processors, when determining the uplink receive beam, are configured to:
determine the uplink receive beam based at least in part on a downlink transmit beam via which the BS transmitted the transmission of the CSI-RS.

51. The BS of claim 46, wherein the one or more processors are further configured to:
determine that the transmission of the CSI-RS and the one or more other transmissions of the CSI-RS were transmitted within a time period based at least in part on transmitting the transmission of the CSI-RS,
wherein the transmission of the CSI-RS and the one or more other transmissions of the CSI-RS are associated with different TCI states; and
wherein the one or more processors, when determining the uplink receive beam, are configured to:
determine the uplink receive beam based at least in part on determining that the transmission of the CSI-RS and the one or more other transmissions of the CSI-RS were transmitted within the time period.

52. The BS of claim 46, wherein the one or more processors are further configured to:
transmit the configuration to the UE based at least in part on transmitting the CSI-RS; and
determine, prior to determining the uplink receive beam, that an uplink transmission is to be scheduled at least the quantity of symbols after the transmission of the CSI-RS is transmitted based at least in part on transmitting the configuration to the UE,
wherein scheduling the uplink transmission forms the scheduled uplink transmission.

53. The BS of claim 46, wherein the one or more processors are further configured to:
determine that another scheduled uplink transmission is not scheduled for at least the quantity of symbols after the symbol,
wherein the scheduled uplink transmission and the other scheduled uplink transmission are different; and
determine another uplink receive beam for the other scheduled uplink transmission based at least in part on determining that the other scheduled uplink transmission is not scheduled for at least the quantity of symbols after the symbol,
wherein the uplink receive beam and the other uplink receive beam are different,
wherein the other uplink receive beam is determined based at least in part on:
a previous transmission of the CSI-RS, or
a most recently used uplink receive beam relative to other uplink receive beams.

54. The BS of claim 46, wherein the one or more processors are further configured to:
receive the scheduled uplink transmission at least the quantity of symbols after the symbol based at least in part on determining that an uplink transmission is to be scheduled at least the quantity of symbols after the symbol,
wherein scheduling the uplink transmission forms the scheduled uplink transmission.

55. The BS of claim 46, wherein, wherein the CSI-RS is one of:
- an aperiodic CSI-RS (A-CSI-RS),
- a semi-persistent CSI-RS (SP-CSI-RS), or
- a periodic CSI-RS (P-CSI-RS).

56. The BS of claim 46, wherein the CSI-RS is configured with repetition.

\* \* \* \* \*